(12) United States Patent
Jack et al.

(10) Patent No.: US 10,697,941 B2
(45) Date of Patent: Jun. 30, 2020

(54) METHOD AND SYSTEM OF NON-DESTRUCTIVE TESTING FOR COMPOSITES

(71) Applicant: BAYLOR UNIVERSITY, Waco, TX (US)

(72) Inventors: David A. Jack, Waco, TX (US); John E. Fitch, Woodway, TX (US); Theresa Vo, Houston, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 515 days.

(21) Appl. No.: 14/386,449

(22) PCT Filed: Mar. 20, 2013

(86) PCT No.: PCT/US2013/033187
§ 371 (c)(1),
(2) Date: Sep. 19, 2014

(87) PCT Pub. No.: WO2013/142621
PCT Pub. Date: Sep. 26, 2013

(65) Prior Publication Data
US 2015/0046098 A1 Feb. 12, 2015

Related U.S. Application Data

(60) Provisional application No. 61/613,482, filed on Mar. 20, 2012.

(51) Int. Cl.
*G01N 29/44* (2006.01)
*G06F 30/20* (2020.01)
(Continued)

(52) U.S. Cl.
CPC ......... *G01N 29/449* (2013.01); *G01N 29/341* (2013.01); *G01N 29/36* (2013.01);
(Continued)

(58) Field of Classification Search
CPC .... G01N 29/449; G01N 29/341; G01N 29/36; G06F 17/5009; G06F 2217/10; G06F 2217/44; G06F 17/50
See application file for complete search history.

(56) References Cited

U.S. PATENT DOCUMENTS

2009/0216129 A1* 8/2009 Lasser .............. A61B 8/00
600/459
2015/0377839 A1* 12/2015 Jack ................ G01N 29/4472
702/33

OTHER PUBLICATIONS

Smith, R.A. And B. Clarke, "Ultrasonic C-scan determination of ply stacking sequence in carbon-fiber composites," Insight—Journal of the British Institute of NDT, vol. 36(10), 1994, pp. 741-747 (Year: 1994).*

(Continued)

*Primary Examiner* — Jennifer E Simmons
*Assistant Examiner* — Leo T Hinze
(74) *Attorney, Agent, or Firm* — Jackson Walker LLP

(57) ABSTRACT

Method and system are disclosed for characterizing and quantifying composite laminate structures. The method and system take a composite laminate of unknown ply stack composition and sequence and determine various information about the individual plies, such as ply stack, orientation, microstructure, and type. The method and system can distinguish between weave types that may exhibit similar planar stiffness behaviors, but would produce different failure mechanisms. Individual ply information may then be used to derive the laminate bulk properties from externally provided constitutive properties of the fiber and matrix, including extensional stiffness, bending-extension coupling stiffness, bending stiffness, and the like. The laminate bulk properties may then be used to generate a probabilistic failure envelope for the composite laminate. This provides the ability to perform non-destructive QA to ensure that (Continued)

individual lamina layup was accomplished according to specifications, and results may be used to identify a numerous laminate properties beyond purely structural.

24 Claims, 14 Drawing Sheets

(51) Int. Cl.
    *G01N 29/34*     (2006.01)
    *G01N 29/36*     (2006.01)
    *G06F 111/08*     (2020.01)
    *G06F 113/26*     (2020.01)

(52) U.S. Cl.
    CPC .......... *G06F 30/20* (2020.01); *G06F 2111/08* (2020.01); *G06F 2113/26* (2020.01)

(56) References Cited

OTHER PUBLICATIONS

Hellier, Charles J., "Handbook of Nondestructive Evaluation," 2003, McGraw-Hill, pp. 7.31-7.39 (Year: 2003).*
Smith, Robert A., et al. "Automated analysis and advanced defect characterisation from ultrasonic scans of composites." Insight-Non-Destructive Testing and Condition Monitoring 51.2 (2009): 82-87.
Cuntze, R. G. "Efficient 3D and 2D failure conditions for UD laminae and their application within the verification of the laminate design." Composites Science and Technology 66.7-8 (2006): 1081-1096.
Radev, Boyan, PCT Search Report for PCT Application No. PCT/US2013/033187 dated Jul. 1, 2013.
Radev, Boyan, PCT Written Opinion for PCT Application No. PCT/US2013/033187 dated Jul. 1, 2013.
Tsai, et al., "A General Theory of Strength for Anisotropic Materials", Journal of omposite Materials, vol. 5, Jan. 1971, pp. 58-80.
Wolfe, et al., "A Strain-Energy Based Failure Criterion for Non-Linear Analysis of Composite Laminates Subjected to Biaxial Loading", Composites Science and Technology, 58, 1998, pp. 1107-1124.
Puck, et al., "Failure Analysis of FRP Laminates by Means of Physically Based Phenomenological Models", Composites Science and Technology, 58, 1998, pp. 1045-1067.
Liu, et al., "A Progressive Quadratic Failure Criterion for a Laminate", Composites Science and Technology, 58, 1998, pp. 1023-1032.
Tandon, et al., "The Effect of Aspect Ratio of Inclusions on the Elastic Properties of Unidirectionally Aligned Composites", Polymer Composites, vol. 5, No. 4, Oct. 1984, pp. 327-333.
Tucker, III, et al., Stiffness Predictions for Unidirectional Short-Fiber Composites: Review ad Evaluation, Composites Science and Technology, 59, 1999, pp. 655-671.
Scida, et al., Prediction of the Elastic Behaviour of Hybrid and Non-Hybrid Woven Composites, Composites Science and Technology, 57, 1997, pp. 1727-1740.
Vo, et al., "Structural Predictions of Part Performance for Laminated Composites", 2011 ECTE Proceedings—ASME Early Career Technical Conference, Fayetteville, Arkansas, 5 pages.
Cuntze, R.G., "Efficient 3D and 2D Failure Conditions for UD Laminae and Their Application Within the Verification of the Laminate Design", Composites Science and Technology, 66, 2006, pp. 1081-1096.
Jones, Robert M., "Mechanics of Composite Materials—Second Edition", Taylor & Francis, 1999, 537 pages.
Examination Report dated Jun. 18, 2018 for co-pending European Patent Application No. EP 13717604.6 as received from the European Patent Office, 6 pages.
Smith, et al., "Automated Non-Destructive Analysis and Advanced 3D Defect Characterisation From Ultrasonic Scans of Composites", ICCM International Conferences on Composite Materials—ICCM—17—17th International Conference on Composite Materials, Jul. 1, 1999, 13 pages.
Cuntze, R.G., "Efficient 3D and 2D Failure Conditions for UD Laminae and Their Application Within the Verification of the Laminate Design", Composites Science and Technology, Elsevier, UK, vol. 66, No. 7-8, Jun. 1, 2006, pp. 1081-1096.
Response to Examination Report dated Jun. 18, 2018 for co-pending European Patent Application No. EP 13717604.6 as filed with the European Patent Office dated Dec. 18, 2018, 16 pages.
Office Action dated Mar. 2, 2020 from the Canadian Intellectual Property Office for co-pending Canadian Patent Application No. 2,868,019, 4 pages.
Lin, et al., "Probabilistic Failure Analysis of Transversely Loaded Laminated Composite Plates Using First-Order Second Moment Method", Journal of Engineering Mechanics, Aug. 2000, pp. 812-820.

* cited by examiner

| PLY NUMB | THETA CALC | THETA ACT | PLY TYPE | COMPUTED | ACTUAL PLY THICKNESS (mm) | | |
|---|---|---|---|---|---|---|---|
| 1 | 0 | 0 | uni | 0.208 | 0.2 | | |
| 2 | 45 | 45 | uni | | | | |
| 3 | -45 | -45 | uni | | | | |
| 4 | 0 | 0 | uni | | | | |
| 5 | 0 | 0 | uni | | | | |
| 6 | 90 | 90 | uni | | | | |
| 7 | -90 | -90 | uni | | | | |
| 8 | 0 | 0 | uni | | | | |
| 9 | 0 | 0 | uni | | | | |
| 10 | -15 | -15 | uni | | | | |
| 11 | 15 | 15 | uni | | | | |
| 12 | 0 | 0 | uni | | | | |
| 13 | 0 | 0 | uni | | | | |
| 14 | -45 | -45 | uni | | | | |
| 15 | 45 | 45 | uni | | | | |
| 16 | 0 | 0 | uni | | | | |

METHOD AND SYSTEM OF NON-DESTRUCTIVE TESTING FOR COMPOSITES

CROSS-REFERENCE TO RELATED APPLICATIONS

The present invention is a 35 U.S.C. 371 application of PCT/US2013/33187 filed Mar. 20, 2013 claims priority to U.S. Provisional Application Ser. No. 61/613,482, entitled "Method and System of Non-Destructive Testing for Composites," filed Mar. 20, 2012, with the United States Patent and Trademark Office.

BACKGROUND OF THE INVENTION

1. Technical Field of Invention

The invention disclosed and taught herein relates generally to a method and system of automatically identifying and characterizing composite laminate structures, or laminates, using ultrasonic non-destructive testing (NDT) techniques. More specifically, the invention disclosed herein relates to a method and system of automatically detecting each layer, or ply, of material in a laminate and determining the bulk properties of the laminate based on the properties of the constituent plies in order to generate a failure envelope for the laminate. The invention disclosed and taught herein also relates to a method and system of simulating an ultrasonic scan of the individual plies of a laminate.

2. Description of Related Art

Composite laminates, or laminates, are typically composed of individual layers of materials that have directionally dependent material properties. Each layer is commonly known as a lamina or ply, and the plies are combined in layers to create a bulk structure that forms the laminate. Knowledge of the individual lamina configuration is important because of the significant effect each lamina has on the final properties of the laminate. For example, in unidirectional fiber orientation plies, the ply is considerably stronger in the fiber orientation direction than in any other direction. The choice of orientation, thickness, stacking sequence, or other property of a lamina within the final composite, will drastically alter the final processed material properties of the laminate.

Composite laminates are used extensively in a variety of structural applications and in numerous industries. For example, carbon fiber reinforced polymers/plastics (CFRP) are a commonly-used type of composite laminates in the aerospace, automotive and other industries. Although CFRPs can be relatively expensive, their superior strength-to-weight ratios make them more desirable than other types of materials. This is reflected by the widespread and steadily increasing use of CFRP components in fixed and rotary wing airframes, for example. Alternatively, a large industry exists that implements alternative reinforcements sacrificing the ultimate tensile strength for other design parameters such as cost, processing ease, etc. Commonly employed fibers may include, but are not limited to, fiberglass, Kevlar, aramid, and other synthetic fibers, as well as a wide variety of natural fibers used as fillers.

Manufacturing carbon fibers usually involves a process where a single continuous carbon fiber filament is constructed with a diameter of roughly 0.005 mm to 0.010 mm. For the type of high quality products used in aerospace applications, a typical fiber diameter will be on the order of 0.005 mm. These filaments are 93% to 95% carbon and have a linear mass of roughly 6.6 grams per meter (g/m). Individual filaments are then wound into a "tow" (i.e., thread or ribbon) that may then be used for various applications. Typical tows have between 3,000 and 12,000 filaments depending on the product application. A 3,000-filament tow has a linear mass of about 0.2 g/m and can be between 0.375 mm and 1.5 mm wide and between 0.2 mm and 0.05 mm thick. By comparison, the diameter of an average piece of thread is approximately 0.375 mm for a 3,000-filament thread.

The tows may be woven into a pattern and then impregnated with resin to form an individual lamina that may then be stacked on other laminas to create a composite laminate layup. The main geometries for an individual lamina are: Percent Warp=percent of orthogonal fibers by weight (where 0% means fibers are unidirectional, and 50% means fibers are woven); Areal Density=$g/m^2$ of fiber in a given lamina; Thread Count=number of individual fiber threads in an individual tow; Tow Width=width in mm of an individual tow; Layer Thickness=thickness of an individual lamina in mm. In contrast, the main geometries for a completed composite layup are: number of laminas, fiber orientation of individual lamina, the lamina type (i.e., woven versus nonwoven, woven type, material makeup), and layup method of individual layers.

The need to repair and modify laminated composites has stretched the capability of existing non-destructive inspection (NDI) techniques. Specifically, to properly modify or repair laminated composites, sufficient fidelity of the underlying microstructure of the composite plies is required to understand the baseline (i.e., unmodified, unrepaired) structure, identify and quantify any as-installed modifications, and analyze the as-installed components for FAA, automotive, and other industry certifications.

In addition, the manufacturing process for composite laminates, as for other materials, inherently includes some variability that can affect the performance of the final part. As such, it is desirable to account for these manufacturing uncertainties and tolerances when quantifying the expected structural response of composite laminates. It is also desirable to quantify the impact of manufacturing defects and varying material properties on a composite laminate's performance. Conversely, if the configuration of a composite laminate can be determined within some degree of confidence, it would be desirable to quantify the expected structural response and life expectancy of that laminate.

Having the ability to detect manufacturing, installation, or usage effects on a composite laminate, with resolutions on the order of individual lamina dimensions and as a function of affected lamina layer, may also minimize modification and maintenance design conservatism or safety margins, leading to reduced manufacturing, installation, and test costs.

The ability to quantify a composite laminate's expected structural response would be particularly useful where the manufacture's data and information about the composite laminate are limited or perhaps unavailable. The problem is compounded by the need in many instances to ascertain the composite laminate's as-fabricated structural characteristics, including stiffness, failure envelope, and the like, without performing destructive testing.

Accordingly, what is needed is a system and method for identifying and characterizing a composite laminate's internal structure using ultrasonic NDT techniques. More particularly, what is needed is a system and method for quantifying the composite laminate's expected structural response based on the assessed properties of the individual laminas.

SUMMARY OF THE INVENTION

Embodiments of the invention provide a method and system for characterizing and quantifying composite laminate structures. The method and system can take a composite laminate of generally unknown ply stack composition and sequence and determine various information about the individual plies, such as the number of plies, ply stack sequence, ply orientations, and the like, based on simulated or actual data representing a scan of the composite laminate. This information, along with information regarding the types of plies and the ply constitutive properties, such as resin type, cure cycle, and specific type of fiber, may then be used to determine a ply failure load. The information about the plies may also be used to derive the laminate bulk properties, such as extensional stiffness, bending-extension coupling stiffness, bending stiffness, and the like. The laminate bulk properties may then be used to generate a probabilistic failure envelope for the composite laminate. Such a method and system allow facility owners and operators in various industries to assess, support, and maintain composite laminate structures, particularly old and aging structures, independently of the original manufacturing failure information or predictions for the composite laminate structures. The system and method further provide the ability to perform non-destructive quality assurance (QA) to ensure, for example, that individual lamina layup was accomplished according to design specifications.

In some embodiments, the scan data used in the above method and system may be ultrasonic scan data. The ultrasonic scan data may be generated by an ultrasonic image simulator, or the scan data may be real data captured by an actual C-scan or equivalent type system. In other embodiments, the scan data used in the above method and system may be acquired using X-ray signals, radio signals, acoustic signals, and the like.

In general, in one aspect, the disclosed embodiments are directed to a computer-aided non-destructive method of quantifying individual laminas in a composite laminate. The method comprises receiving composite scan data by a processor, the composite scan data representative of a composite scan of the composite laminate, the composite scan data indicating, for each one of an array of spatial locations across a surface of the composite laminate, signal intensity and signal time-of-flight for a signal reflected and refracted off material transitions within the composite laminate. The method also comprises determining one or more lamina properties by the processor based on the composite scan data, the one or more lamina properties including number of individual laminas, fiber orientation of each individual lamina, ply type, including unidirectional or weave, weave type, and thickness of each individual lamina. The method further comprises calculating a failure load for the individual laminas by the processor based on the one or more a-priori known lamina moduli and failure parameters. A probabilistic failure envelope may then be estimated for the composite laminate by the processor using one or more of the lamina failure parameters.

In general, in another aspect, the disclosed embodiments are directed to a computer system for non-destructive quantifying of individual laminas in a composite laminate. The computer system comprises a processor and a storage device connected to the processor. The storage device stores an application thereon for causing the processor to receive composite scan data into the computer system. The composite scan data is representative of a composite scan of the composite laminate, the composite scan data indicating, for each one of an array of spatial locations across a surface of the composite laminate, signal intensity and signal time-of-flight for a signal reflected and refracted off material transitions within the composite laminate. The application stored on the storage device also causes the processor to determine one or more lamina properties based on the composite scan data, the one or more lamina properties including number of individual laminas, fiber orientation of each individual lamina, ply type, including unidirectional or weave, weave type, and thickness of each individual lamina. The application stored on the storage device further causes the processor to calculate a failure load for the individual laminas based on the one or more lamina properties. A probabilistic failure envelope for the composite laminate may then be estimated using one or more of the lamina properties and the failure load for the individual laminas.

In general, in yet another aspect, the disclosed embodiments are directed to a computer-readable medium containing computer-readable instructions for instructing a computer to perform non-destructive quantifying of individual laminas in a composite laminate. The computer-readable instructions comprise instructions for causing the computer to receive composite scan data, the composite scan data being representative of a composite scan of the composite laminate. The composite scan data indicates, for each one of an array of spatial locations across a surface of the composite laminate, the signal intensity and signal time-of-flight for a signal reflected and refracted off material transitions within the composite laminate. The computer readable instructions also comprise instructions for causing the computer to determine one or more lamina properties based on the composite scan data, the one or more lamina properties including number of individual laminas, fiber orientation of each individual lamina, ply type, including unidirectional or weave, weave type, and thickness of each individual lamina. The computer readable instructions further comprise instructions for causing the computer to calculate a failure load for the individual laminas based on the one or more lamina properties. A probabilistic failure envelope for the composite laminate may then be estimated using one or more of the lamina properties and the failure load for the individual laminas.

These embodiments provide a solution that is useful in a number of industrial and manufacturing areas, including quality control, for example. Other areas that may benefit from the disclosed embodiments may include applications in the field of ultrasonic detector design. Still other areas benefiting from the disclosed embodiments may be developed by those having ordinary skill in the art.

DESCRIPTION OF THE DRAWINGS

The foregoing and other aspects of the disclosed embodiments will become apparent from the following detailed description and upon reference to the drawings, wherein.

DESCRIPTION OF DISCLOSED EMBODIMENTS

Figure 1:
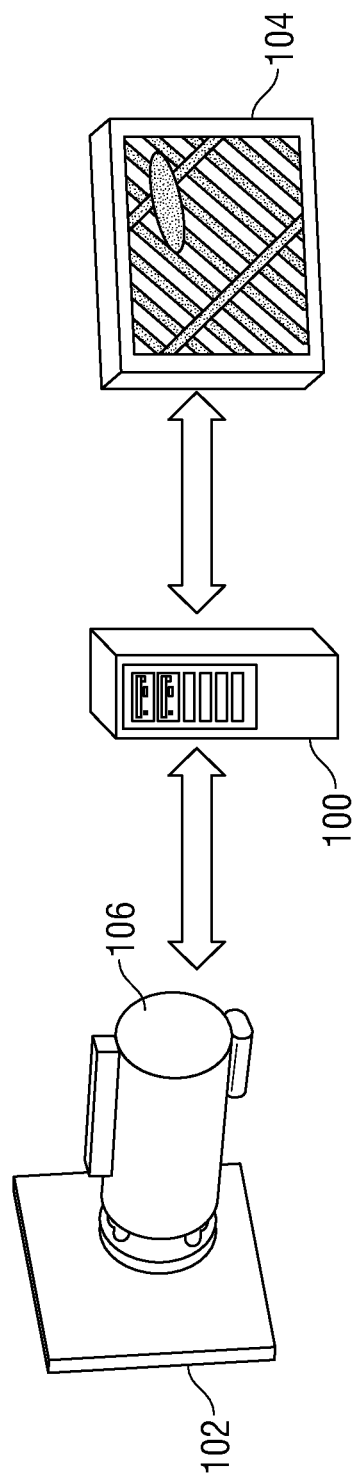
FIG. 1 illustrates an exemplary system and method for characterizing composite laminate structures in accordance with one or more embodiments disclosed herein.

The drawings described above and the written description of specific structures and functions below are presented for illustrative purposes and not to limit the scope of what has been invented or the scope of the appended claims. Nor are the drawings drawn to any particular scale or fabrication standards, or intended to serve as blueprints, manufacturing parts list, or the like. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual, real commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention or the appended claims.

As alluded to above, the disclosed embodiments relate to a system and method for characterizing and quantifying a composite laminate microstructure. In general, the system and method may be used to derive a 3-dimensional model of the composite laminate structure, both the overall shape and the internal structure. This 3-dimensional model, which can include and otherwise account for inherent variability and tolerances in the laminate manufacturing process, may then be used to determine the properties and characteristics of the composite laminate.

In some embodiments, the 3-dimensional model may be generated using a scan of the composite laminate. This scan may be an ultrasonic scan in some implementations, or it may be a scan based on other types of signals, for example, X-ray, radio waves, sound waves, and the like. The scan, or rather the data representing the scan, may be acquired using a real detector operating on an actual physical sample, or it may be generated using a virtual or simulated detector instead. Thereafter, certain properties and characteristics of the composite laminate may be determined from the scan to allow an assessment of the composite laminate without the need for the original or OEM (original equipment manufacturer) or MRO (maintenance, repair, and operations) records.

FIG. 1 illustrates an example of a composite laminate characterization system 100 in accordance with the disclosed embodiments. In the exemplary embodiment of FIG. 1, the composite laminate characterization system 100 is an ultrasonic system 100, although as mentioned above, an X-ray system, radio wave system, sound wave system, and the like, may also be used without departing from the scope of the disclosed embodiments.

Among its various functions, the laminate characterization system 100 may be used to perform NDT and/or NDI on a composite laminate sample 102 to determine and quantify its properties and characteristics, symbolized by the image shown at 104. In basic operation, the composite laminate characterization system 100 receives scan data representing ultrasonic response signals that have traveled through and are subsequently reflected back from the composite laminate sample 102. Based on the scan data, the laminate characterization system 100 may derive and ascertain certain information about the properties and characteristics of the plies making up the composite laminate sample 102. Such properties and characteristics may include, for example, the ply fiber orientation, ply thickness, defect locations, and the like.

In some embodiments, the scan data for the composite laminate sample 102 may be A-scans, B-scans, or C-scans. An A-scan is generally understood to be a measure of the amplitude and flight time (or travel time) of the ultrasonic signals reflected along the Z-axis (or depth direction) of the sample 102 over the surface (or X-Y plane) of the sample. The A-scan generally indicates the presence of various features and defects in the sample. In graph form, the A-scan usually has the signal energy displayed along the vertical axis and the signal flight time displayed along the horizontal axis.

B-scans, on the other hand, provide a profile or cross-sectional slice of the sample. In a B-scan, the graph typically displays the intensity of the returned signal as a function of depth along a linear element which is typically along either the X or Y direction, displayed along the horizontal axis. The intensity information provides a cross-sectional view showing where various features and defects are located in that cross-section of the sample.

C-scans provide a plan or top view of specific layers or depths within the sample. Such scans may be used to identify the location (i.e., the X and Y coordinates) and size of any features or defects within the sample. In graph form, this is usually displayed with the Y coordinates along the vertical axis and the X coordinates along the horizontal axis. C-scans are typically produced with an automated data acquisition system and usually involve a computer controlled scanning system, or the like, to capture reflected signals at each point along a predefined grid over the surface of the composite laminate sample.

The laminate characterization system 100 may accept scan data from a real, commercially-available ultrasonic detector 106, such as those available from US Ultratek, Inc., of Concord, Calif. An alternative approach may include using an A-scan system configured to translate the transducer, or alternatively the sample being scanned, in space with scans at specific locations. These selective A-scans may then be collected in the laminate characterization system 100 to create a C-scan. The laminate characterization system 100 may also accept scan data generated by an ultrasonic image simulator for purposes of testing and validating the system. Such simulated data tends to be cleaner and more free of noise and artifacts than real scan data from a physical sample and therefore more useful in some cases, for example, in initializing, configuring, and fine-tuning the laminate characterization system 100.

As mentioned above, in normal operation, the laminate characterization system receives an ultrasonic scan of the composite laminate sample. This scan data may indicate, for each one of an array of spatial locations on a surface of the composite laminate sample, the signal intensity and signal time-of-flight for a signal reflecting off the layers or plies within the composite laminate sample. The laminate characterization system 100 may then determine one or more properties for the individual plies making up the composite laminate sample 102. Ply properties may include, for example, the number of individual plies, orientation of each individual ply, thickness of each individual ply, lamina type (unidirectional or weave), weave type, and total thickness of the composite laminate sample. Thereafter, the laminate characterization system 100 may be used to calculate one or more bulk properties for the composite laminate sample 102 given the appropriate constitutive stiffness values of the fiber and the matrix along with their respective failure parameters, including extensional stiffness, bending-extension coupling stiffness, and bending stiffness, based on properties for the individual plies (e.g., resin type, cure cycle, specific type of fiber, etc.). Once the bulk properties have been determined, this information may then be processed by the laminate characterization system 100 to estimate a probabilistic failure envelope for the composite laminate sample 102.

In some embodiments, the laminate characterization system 100 may be implemented as a general-purpose computer, as depicted in FIG. 1, or it may be implemented as a dedicated computer that has been custom developed for the purpose. In other embodiments, the laminate characterization system 100 may be implemented in, or as part of, an ultrasonic detector, such as the ultrasonic detector 106. This latter implementation may produce a completely self-contained composite laminate characterization system that can both scan a composite laminate sample and analyze its own scan data directly (i.e., no separate analysis system is needed).

Referring still to FIG. 1, the laminate characterization system 100 is useful for, and has applicability in, a large number of industrial and manufacturing environments. One example where the laminate characterization system 100 may be particularly beneficial is in situation where information from the OEM or from an after-market modification on the composite stack is limited or perhaps unknown and the as-fabricated structural characteristics (e.g., stiffness and/or failure envelope) must be obtained without destructive testing. Another application may be in the field of quality control, for example, to compare the as-fabricated laminate behavior with the as-designed characteristics. Yet another area where the laminate characterization system may be useful is in ultrasonic detector design and/or selection for a known class of composite laminates.

Figure 2:
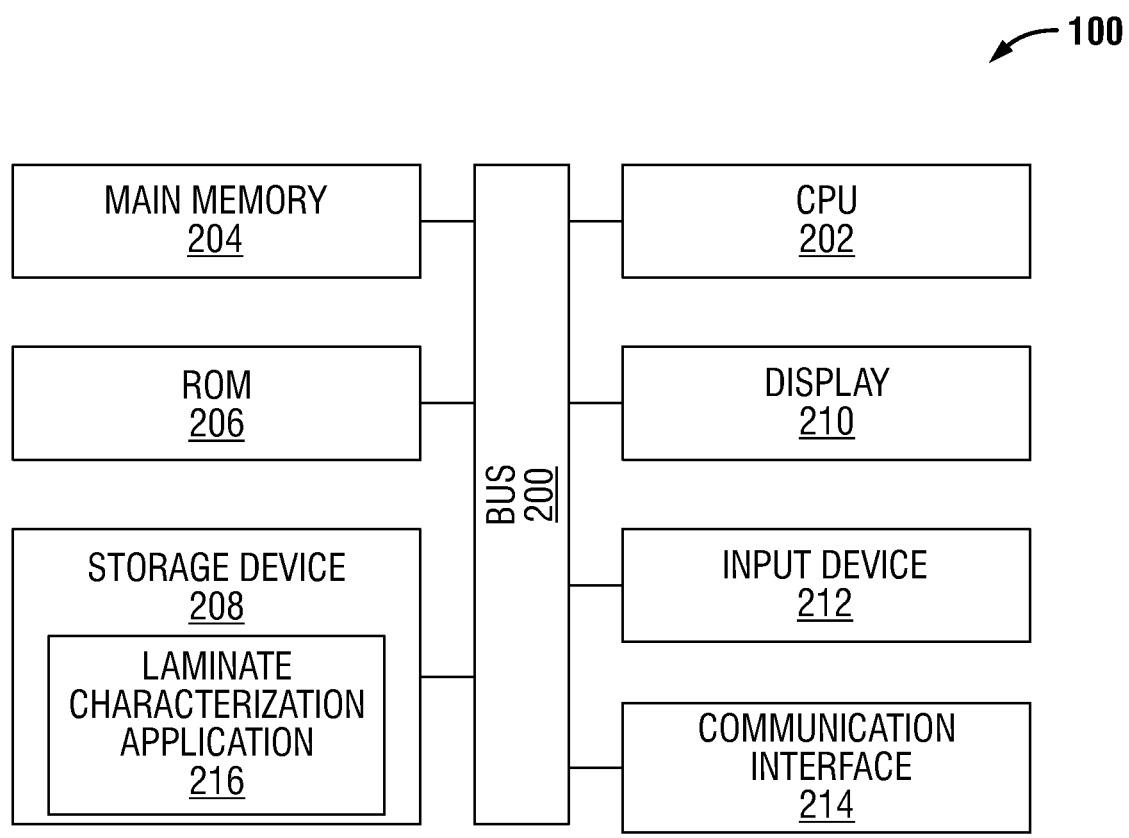
FIG. 2 illustrates the exemplary composite laminate characterization system of FIG. 1 in more detail in accordance with one or more embodiments disclosed herein.

FIG. 2 illustrates the exemplary laminate characterization system 100 of FIG. 1 in more detail, including some of the components that may be used in the system. Such a system 100 may be a conventional workstation, desktop, or laptop computer, or it may be more like a mobile or handheld system, or it may be a custom-developed system, such as an ultrasonic detector that includes the additional capability discussed herein. In the example shown, the laminate characterization system 100 may include a bus 200 or other communication mechanism for transferring information within the laminate characterization system 100, and a CPU 202 coupled with the bus 200 for processing the information. The laminate characterization system 100 may also include a main memory 204, such as a random access memory (RAM) or other dynamic storage device coupled to the bus 200 for storing computer-readable instructions to be executed by the CPU 202. The main memory 204 may also be used for storing temporary variables or other intermediate information during execution of the instructions to be executed by the CPU 202. The laminate characterization system 100 may further include a read-only memory (ROM) 206 or other static storage device coupled to the bus 200 for storing static information and instructions for the CPU 202. A computer-readable storage device 208, such as a Flash drive or magnetic disk, may be coupled to the bus 200 for storing information and instructions for the CPU 202.

The term "computer-readable instructions" as used above refers to any instructions that may be performed by the CPU 202 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 208. Volatile media may include dynamic memory, such as main memory 204. Transmission media may include coaxial cables, copper wire and fiber optics, including wires of the bus 200. Transmission itself may take the form of electromagnetic, acoustic or light waves, such as those generated during radio frequency (RF) and infrared (IR) data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 202 may also be coupled via the bus 200 to a display 210 for displaying information to a user. One or more input devices 212, including alphanumeric and other keyboards, mouse, trackball, cursor direction keys, and so forth, may be coupled to the bus 200 for communicating information and command selections to the CPU 202. A communications interface 214 may be provided for allowing the laminate characterization system 100 to communicate with an external system or network.

In accordance with the disclosed embodiments, a laminate characterization application 216, or rather the computer-readable instructions therefor, may also reside on or be downloaded to the storage device 208. The laminate characterization application substantially embodies the concepts and principles of the earlier-mentioned laminate characterization application in the form of a specific software application developed using a particular programming language. Such a software application may then be executed by the CPU 202 and/or other components of the laminate characterization system 100 to analyze and characterize the structure of composite laminate materials, as will be discussed further herein.

The programming language used to implement the laminate characterization application 216 may be any suitable programming language known to those having ordinary skill in the art, and the application may be developed in any suitable application development environment known to those having ordinary skill in the art. Examples of programming languages may include MATLAB (from The MathWorks, Inc.) and LabVIEW (from National Instruments, Inc.), as well as C, C++, FORTRAN, and Visual Basic and the like.

Figure 3:
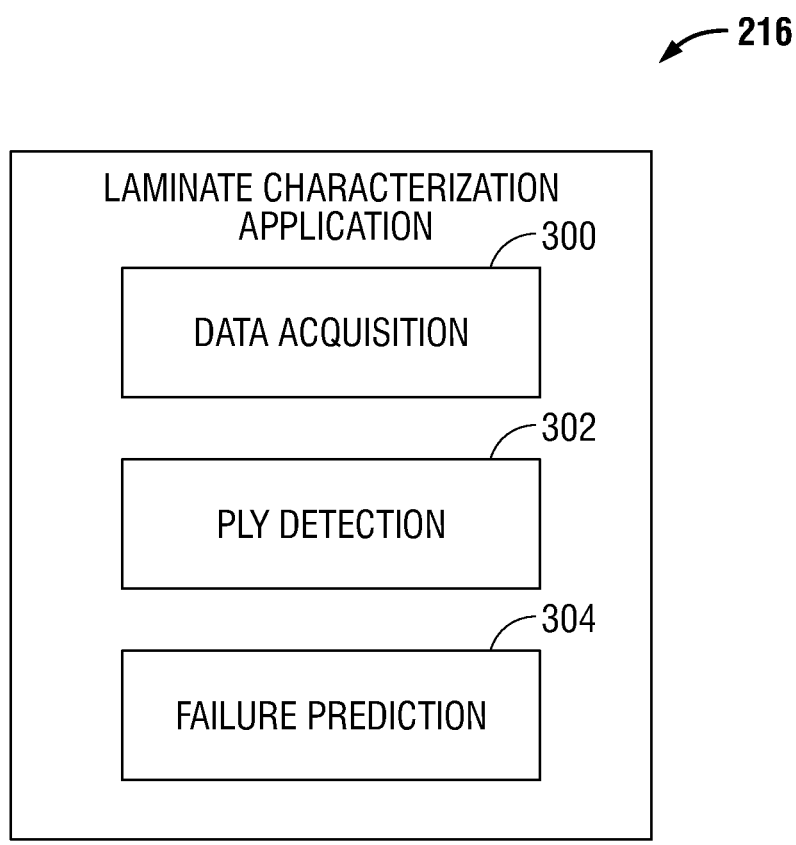
FIG. 3 illustrates an exemplary laminate characterization application in accordance with one or more embodiments disclosed herein.

Referring now to FIG. 3, in one embodiment, the laminate characterization application 216 may comprise a number of discrete functional components, including a data acquisition component 300, a ply detection component 302, and a failure prediction component 304. Although not specifically shown, a graphical user interface (GUI) may also be present in some embodiments for allowing users to interact with and provide input to one or more of the functional components. Other functional components may also be part of the laminate characterization application 216 without departing from the scope of the disclosed embodiments. Note that although the functional components of the laminate characterization application 216 have been depicted as individual components in FIG. 3, those having ordinary skill in the art will understand that two or more of these components may be combined into a single component, and that any individual component may be divided into several constituent components, or omitted altogether, without departing from the scope of the disclosed embodiments.

In general operation, the data acquisition component 300 functions to receive and process scan data into the laminate characterization application 216 for characterization and testing of a given composite laminate sample. This scan data may come from an ultrasonic image simulator, as described further below, or from a real ultrasonic detector. In either case, the data acquisition component 300 may also process the scan data in some embodiments, including scrubbing and cleaning the data as needed of any extraneous or unwanted input, such as noise and artifacts from the ultrasonic detector. In some embodiments, instead of a single pulse for a given location, several pulses (e.g., 5 to 20) of the same location may be taken, then the signals are averaged together.

Figure 4:
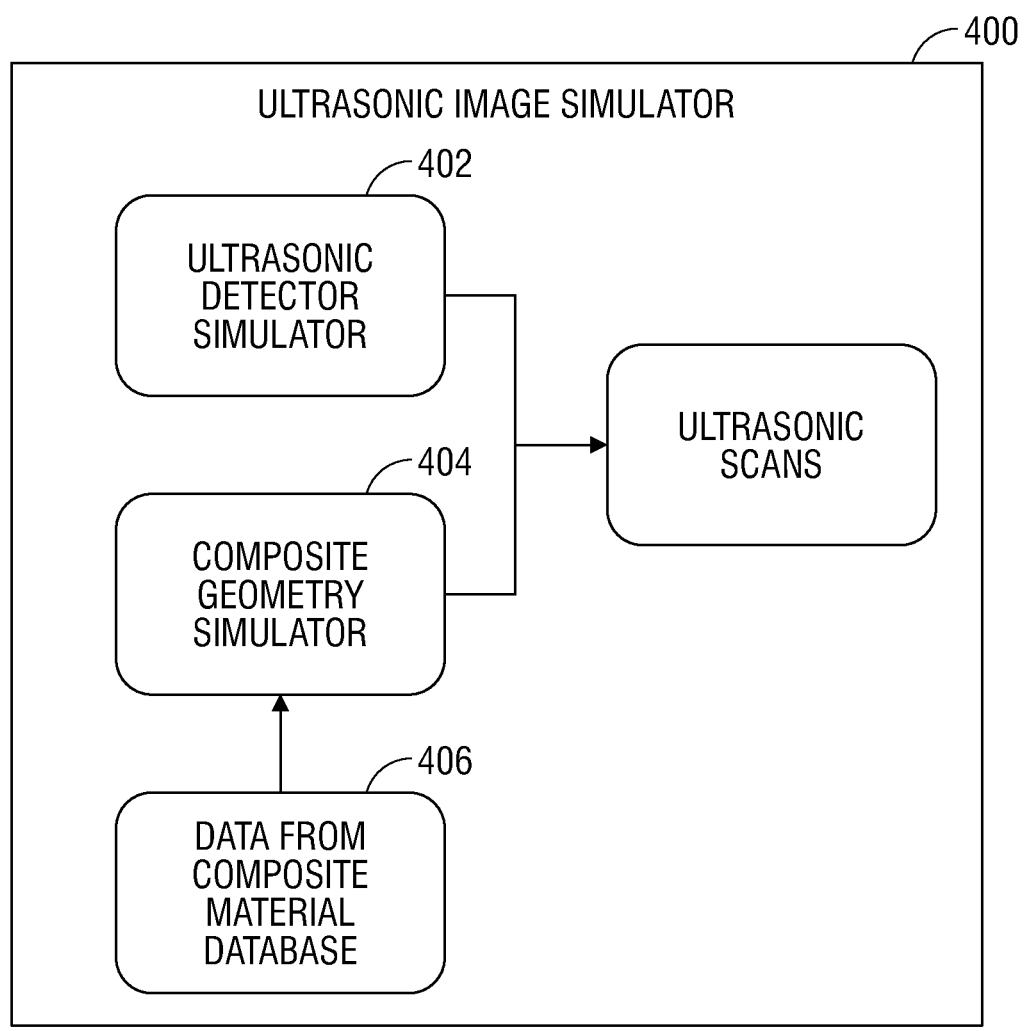
FIG. 4 illustrates an exemplary ultrasonic image simulator that may be used with the laminate characterization application in accordance with one or more embodiments disclosed herein.

An example of an ultrasonic image simulator that may be used with the laminate characterization application 216 in some embodiments is depicted in FIG. 4. As can be seen, the ultrasonic image simulator 400, like the laminate characterization application 216, may be composed of several functional components, including an ultrasonic detector simulator 402 and a composite geometry simulator 404. As before, other functional components may also be part of the ultrasonic image simulator 400 without departing from the scope of the disclosed embodiments. The composite material data needed to conduct the simulation may be provided from one or more readily available composite material database 406 or other sources. In general, the ultrasonic detector simulator 402 operates to emulate real ultrasonic response signals, while the composite geometry simulator 404 generates the geometries of a composite laminate sample. These two functional components operate together to produce ultrasonic scans, or rather the data representing the scans, of the composite laminate samples.

In some embodiments, the ultrasonic image simulator 400 may be configured to simulate ultrasonic response signal from a C-scan or C-scan equivalent detector in pulse-echo mode (though it is also possible for the ultrasonic image simulator 400 to operate in through-transmission mode). The ultrasonic image simulator 400 may accomplish this by using standard or known theories for 1-dimensional sound wave propagation within an attenuating medium (see, e.g., Schmerr, L. W., *Fundamentals of Ultrasonic Nondestructive Evaluation*, 1998, Plenum Press; Lonne et al., *Review of Quantitative Nondestructive Evaluation*, 2004, pp. 875-882). An acoustic pulse within an attenuating medium will generate a refraction and reflection wave whenever there exists a material boundary, such as occurs within the CFRP as the wave passes between the resin rich regions and the impregnated carbon fibers. In accordance with the disclosed embodiments, the ultrasonic image simulator 400 can generate ultrasonic C-scan images for various industrial ply types over a wide range of defects, including misalignments during layup, voids due to manufacturing limitations, and intentionally fabricated holes such as for mounting the component.

The scan data may then be analyzed by the ply detection component 302. In some embodiments, the ply detection component 302 does this by analyzing each time integration point (where time is directly correlated to depth within the laminate) and using an appropriate mathematical image reconstruction mechanism to capture the primary directions of the ply. In some embodiments, the Radon transform, Hough transform, an Eigensystem analysis, Fast Fourier transform, and the like may be used to determine the fiber principal directions and thus the fiber orientation directions of a given laminate. Each C-scan is integrated in X and Y directions to produce a bulk signal for a given depth in the lamina (as shown in the examples in FIG. 8). The overall lamina thickness is determined by the time of flight of the signal to the back wall of the lamina. Individual ply thickness is determined by the time of flight between the individual peaks in the bulk signal. The eigenvectors generally correspond to the alignment direction of the ply at a given depth, and the ratio of the transform peaks generally correspond to whether the ply is unidirectional (i.e., this would be analogous to when the first eigenvalue is much higher than the second eigenvalue, and could also be found using classical eigenvalue analysis) or is a woven fabric (i.e., when the transform peaks are of similar magnitude) where the ratio implies the degree of warp within an individual ply.

In some embodiments, the stack thicknesses and ply orientation is then used with the results from the ply detection component 302 along with the constitutive material properties of the matrix and reinforcement to obtain the structural stiffness tensor using known laminate theories (see, e.g., R. M. Jones, *Mechanics of Composite Materials, Second Edition*, New York, Taylor and Francis, 1999 ("Jones"), where in the present configuration the lamina stiffness is obtained using the well-known Tandon-Weng theory (see Tandon, G. P. and G. J. Weng, *The Effect of Aspect Ratio of Inclusions on the Elastic Properties of Unidirectionally Aligned Composites*, Polymer Composites, 5(4):327-333, 1984 ("Tandon-Weng")) with the closed form solution implied by Tucker and Liang (see Tucker, C. L. and E. Liang, *Stiffness Predictions for Unidirectional Short-Fiber Composites: Review and Evaluation*, Composites Science and Technology, 59:655-671, 1999 ("Tucker and Liang")) for unidirectional laminas. There exist a host of many alternative micromechanical methods to predict the ply stiffness response once the underlying constitutive ply makeup is understood, and the above are just understood to be one of the better alternative schemes. It is of course possible and known to analyze the stack thicknesses and fiber orientation for hybrid and non-hybrid woven fibers as well as unidirectional fibers. See, e.g., Scida et al., *Elastic behavior prediction of hybrid and non-hybrid woven composite*, Comp. Science and Technology, 1997, 57:1727-1740 ("Scida").

If the manufacture-supplied stiffness ("C") and/or compliance ("S") tensors (one is the inverse of the other) is provided, the stiffness of a unidirectional laminate in the principal material directions may be found from the constitutive materials. On the other hand, if a unidirectional ply is assumed, only the properties of the constitutive materials are needed, such as the isotropic stiffness of the epoxy and the transversely isotropic stiffness tensor of the carbon fibers. These values may be used as taught in Tandon-Weng, to return the effective stiffness of the lamina using a unidirectional plane stress approximation. Another option is the outdated, but industrially-accepted method discussed in Halpin, J. C. and J. L. Kardos, *The Halpin-Tsai Equations: A Review*, Polymer Engineering and Science, 16(5):344-352, 1976 ("Halpin-Tsai"), or as discussed in Tucker and Liang, the more accurate approach of Mori, T. and K. Tanaka, *Average Stress in Matrix and Average Elastic Energy of Materials with Misfitting Inclusions*, Acta Metallurgica, 21:571-574, 1973 ("Mori-Tanaka"), of using the approach outlined in Tandon-Weng. Both approaches require knowledge of the Young's modulus and Poisson Ratio of the fiber, $E_f$ and $v_f$, respectively, and the matrix, $E_m$ and $v_m$. In addition, they require the volume fraction of fibers $v_f$ and the effective aspect ratio of the individual fibers within the tows $a_r$. Completion of these calculations return the stiffness and compliance tensors, along with the desired planar Young and Shear Moduli and Poisson's Ratios, $E_{11}$, $E_{22}$, $G_{12}$, $G_{23}$, $v_{12}$, and $v_{23}$, which could alternatively be obtained directly from the components of S. This tensor can then be rotated into the composite coordinates using standard tensor rotations. Once the underlying stiffness tensor for a given lamina is understood, any of a variety of classical laminate theories may be used to predict the fabricated composite's stiffness components. See, e.g., Barbero, E. J., *Introduction to Composite Materials Design, Second Edition*, 2011 ("Barbero"); Jones.

The individual lamina failure envelopes may thereafter be used by the failure prediction component 304 to generate a failure envelope for the composite laminate, once the ply stiffness is known and the material failure parameters of the matrix and fiber are known. This may be accomplished using any of the industrially-accepted techniques, such as the Tsai-Wu failure criteria. See, e.g., Tsai, S. W., and Wu, E. M., *A general theory of strength for anisotropic materials*, J. Compos. Mater., 5, pp. 58-80 1971 ("Tsai-Wu"); see also Jones or Barbero. In general, the Tsai-Wu criteria may be used to generate the failure envelope of the lamina, and that information may then be used with ply failure theories to predict the failure of the laminate. Unlike traditional approaches that assume the load is planar, the failure prediction component 304 can handle a generalized 6-dimensional loading condition, including 3 different mutually orthogonal normal stresses and 3 different mutually orthogonal shearing stresses. In some embodiments, the failure envelopes of the composite laminates may be analyzed assuming a degree of uncertainty within the stack, such as the ply orientation, and the probabilistic failure envelopes may be generated using a Monte-Carlo approach. See, e.g., Vo, T. and D. A. Jack, *Structural Predictions of Part Performance for Laminated Composites*, 2011 ECTC Proceedings. This approach allows characterization of a probabilistic confidence of the actual failure envelope of the as-processed composite laminate based on the uncertainties in the ply detection algorithm.

The above embodiments are particularly useful for modifiers of composite structures who do not have direct access to original manufacturing, operations, maintenance and repair information. QA personnel who provide various composite structure quality assurance services where the OEM information is typically available may also find the disclosed laminate characterization system beneficial. In general, the laminate characterization system can help provide: detailed comparison of as-manufactured to as-designed composite structures; detailed characterization of initial state load carrying capability; detailed characterization of use or age related intra-lamina issues; reduction or elimination of so-called "coupon" or sample testing requirements; reduction in margins of safety in design leading to reduced weight for composite end items; the ability to independently and non-destructively validate composite material stack up without OEM or MRO design or manufacturing records; and the ability to certify a modified composite structure or structural repair without OEM design or load information using an equivalent strength methodology.

Detector Considerations

With respect to the types of detectors that may be used, the major parameters that affect an ultrasonic pulse within a medium are the speed of sound within a particular material and the optical impedance of the material, defined as the material density multiplied by the local speed of sound. Also of interest is the type of wave generated by the detector. There are typically two types of waves of interest in NDT, plane waves and shear waves. Both types will be present within any given material, but depending on the detector configuration one or both types may be captured. Some detectors use a fluidic interface between the detector and the material being sampled, and thus due to the inability of shear waves to pass through a fluidic media, these detectors are best used in a pulse-wave dominated configuration using a pulse-echo method where a single transducer is used as both a transmitter and a receiver or in a through transmission mode where one transducer is placed on each side of the object of interest. The signal will be scattered whenever a change in the acoustic impedance (often defined loosely as the material density times speed of sound) changes within a structure, thus whenever a beam passes between the matrix and a tow, a signal will be scattered and the objective of NDT is to capture and interpret this signal.

A third parameter of interest is the attenuation of the signal's power as a function of frequency. In graphite composites, for example, the speed of sound is in a range near 3 mm/µs. At 10 MHz, the cycle time for a single wavelength is 0.1 µs or 100 ns and the corresponding wavelength is 0.3 mm. Thus, the cycle time for an individual wavelength must be less than or equal to the sensor gate (integration) time to avoid errors in detected signal amplitude due to partial wave integrations.

Pulse-wave detectors function by sending out a pulse and waiting for the echoes from the changing impedance of the target material. The variables of interest for these detectors are the 'z-start' and 'z-gate' times. The z-start time is the time at which the detector starts to detect and integrate the echoed signal in the z-axis (equivalent to the depth), and the z-gate time is the period during which the detector is integrating or "listening" to the echoed signal. These times correspond, respectively, to the initial depth and thickness of the lamina being test. For example, using a 10 MHz signal in a CFRP laminate, a z-start of 0 and a z-gate of 1.0 µs corresponds to an image that starts at the laminate's surface and produces an echoed signal from the first 3 mm of material. Sub-microsecond z-gates and frequencies greater than 10 MHz are therefore necessary to detect fiber tows with typical thicknesses of 0.214 mm. A 20 MHz detector with a 50 ns z-gate would allow a theoretical resolution of 0.145 mm.

The detector resolution is also a function of the ultrasonic image's pixel resolution, with each pixel representing the smallest discrete spatial location that can be assessed for a given composite laminate sample. A typical pixel may be about 0.21 mm in the X and Y directions (i.e., length and width) for high end commercially available characterization systems, corresponding to a signal having about a 20 MHz frequency. The choice of frequency is a trade-off between spatial resolution of the image and imaging depth. Lower frequencies produce less resolution, but penetrate deeper into a sample. Higher frequencies have a smaller wavelength and thus are capable of reflecting or scattering from smaller structures, but have a larger attenuation coefficient and thus the signal is more readily absorbed by the plies, limiting the penetration depth of the signal.

Following is a more detailed description of some of the methods, assumptions, and procedures used with the laminate characterization application 216 in accordance with some embodiments, beginning with operation of the ultrasonic image simulator 400.

Geometric Simulation

As mentioned with respect to FIG. 4, in some embodiments, the ultrasonic image simulator 400 may include a composite geometry simulator 404 configured to provide the geometry of a laminate. The composite geometry simulator 404 takes as inputs the areal density, fiber tow width, and warp percentage to establish the spacing of the fibers for a given lamina in the X and Y directions (i.e., length and width). This information may be provided, for example, from a composite material database 406 and the like and includes the ply material thickness. The composite geometry simulator 404 then builds a 3-dimensional matrix of layers by orienting individual fibers to the layer angle of orientation input by the user. Because fiber placement is usually not rigorously controlled to sub-tow width, the composite geometry simulator 404 randomly adjusts the starting fiber position for each layer (i.e., so the fibers will not typically lay perfectly on top of one another in the X and Y directions even for layers having the same orientation). In addition, depending on manufacturing technique, fiber orientation is not perfect, and the composite geometry simulator 404 may be configured to simulate such imperfection. Specifically, the composite geometry simulator 404 may simulate fiber orientations from the following processes: machine layup (almost no orientation variability from planned), machine assisted layup (about 0.8 degrees standard deviation from planned), and hand layup (about 4 degrees standard deviation from planned).

In addition, the composite geometry simulator 404 may also be configured to simulate voids between the individual layers of the laminate. In the assembly of individual layers, air can become trapped, leading to an epoxy void between layers. In real applications, these voids effectively absorb the ultrasonic pulse so that the layers below these voids are not detected. Typical values of voids are 1% to 2% by volume of the composite laminate. The geometry simulator allows for the introduction of these voids and can simulate them randomly between layers. The voids have material properties of air and can be made ellipsoid in shape and vary randomly in size, X, Y and interlayer position. Void volumes are user selectable between 0%, 1%, 1.5%, 2%, or more by volume.

The composite geometry simulator 404 also has the ability to introduce drilled holes of various diameters and X and Y positions. These also are simulated with material properties of air, but unlike the voids, these continue through all layers.

Finally, the composite geometry simulator 404 allows the user to simulate a rectangular insert of a different material property between selected layers. In practice, these inserts are typically made of Teflon or similar material. The rectangular area is simulated by assigning the desired materials density and associated speed of sound in the geometry matrix where desired. The purpose of this rectangular insert is to simulate a large scale "flaw" in the material that, unlike the voids discussed above, does not cause an ultrasonic signal to be completely absorbed by the flaw, so continued detection beneath this material is possible. The insert may then be used as a way to properly calibrate X, Y and Z resolution.

Ultrasonic Detector Simulation

In general, the ultrasonic detector simulator 402, which may be developed using MATLAB or other similar programming language, makes use of well-known NDT fundamentals (see, e.g., Schmerr, L. W., *Fundamentals of Ultrasonic Nondestructive Evaluation*, Plenum Press, 1998) ("Schmerr"). This ultrasonic detector simulator 402 may be for a general multidimensional signal with both plane and shear waves, or it may be simplified for a 1-D pulse-echo assumption (no shear waves). Such an ultrasonic detector simulator 402 may then be used to provide a simulation of an ultrasonic C-scan for a composite laminate.

In the present embodiment, each discrete spatial location (i.e., pixel) in the ultrasonic C-scan, the ultrasonic detector simulator 402 uses knowledge of the location of the transition between each layer as well as the material properties (e.g., speed of sound, material density, etc.) of the layer from the geometric simulator. The governing differential equations of an acoustic medium are then solved numerically to simulate an ultrasonic wave translating within the part at an individual spatial location. The resulting intensity solution as a function of time is typically stored in an array for each spatial location in the simulated scan, such that each spatial location is associated with a separate array.

The ultrasonic detector simulator 402 also uses inputs for the wave intensity at the initial surface. Using an Ordinary Differential Equation (ODE) solver, the wave front may be computed as a function of time. Although an ODE solver is not needed to determine how long it takes for a wave to pass between the layers, the ODE solver has an additional benefit in that signal attenuation may be readily incorporated. The full analysis for the wave propagation is not described in detail here, as it may be readily obtained from standard NDT textbooks, including Schmerr.

Care should be taken when the wave enters a boundary and reflects/refracts, as the equations that capture reflection/refraction behavior between layer transitions involving pure epoxy and epoxy/fiber layers (see, e.g., Equations (6.157)-(6.168) of Schmerr) for an incident p-wave (a.k.a., the elastic wave of the pressure wave, often attributed to compression effects) and the s-wave (a.k.a. the shear wave or the secondary wave, often attributed to the change in shape of an object) assume that the interface between layers is represented by a mathematically continuous contact. This is appropriate when there is perfect (or near perfect) bonding between the fiber and the resin.

The intensity of each wave is a function of the amplitude of the pressure pulse, density of the material, the speed of sound of the material, and attenuation behavior of the medium. Using Equations (6.7)-(6.16) of Schmerr, the ultrasonic detector simulator 402 is able to properly account for the intensity of every individual ray within the laminate.

In some of the lower quality embodiments, the ultrasonic detector simulator 402 assumes an ideal material where there is no signal attenuation within the medium, although this may not be realistic for higher frequencies (e.g., greater than 10 MHz), as it is known that as the frequency of the incident signal increases, polymeric materials tend to damp out the signal. An additional feature of the ultrasonic detector simulator 402 is the ability to tailor the intensity cutoff, thus mimicking the physical threshold of the physical detector. In general, the more layers exist within a laminate, the more independent rays will exist within the composite due to the bounce-between of the rays between layers. The more a ray bounces between layers and splits into a reflected and refracted wave, the weaker the signal becomes.

The current ultrasonic detector simulator 402 also performs post-processing to analyze the dependence of the returned signal output for both pulse duration, $\Delta t_{Power\ Pulse}$, and z-gate width, $\Delta t_{z\text{-}gate}$. For example, if the detector pulse were left on too long or had a long ring time after the initial pulse, it would be impossible to distinguish the returned signal from individual layers. The z-gate width is also a significant consideration as a z-gate value that is too large will capture the return signal from multiple layers. The smaller the z-gate, the greater the accuracy of the detector, but this comes at a reduction in the total intensity and thus could impose on threshold lower limits.

In some embodiments, the ultrasonic detector simulator 402 may simulate certain physical detectors, which do not return the signal as a function of time. Instead, the ultrasonic detector simulator 402 may return the average intensity of the signal as a function of time through a form similar to:

$$\bar{I}(t_{z\text{-}gate\ start}, \Delta t_{z\text{-}gate}) \equiv \frac{1}{\Delta t_{z\text{-}gate}} \int_{t_{z\text{-}gate\ start}}^{t_{z\text{-}gate\ start}+\Delta t_{z\text{-}gate}} I(t, \Delta t_{Power\ Pulse}) dt \quad (1)$$

where $\bar{I}(t_{z\text{-}gate\ start}, \Delta t_{z\text{-}gate})$ is the average intensity at a given start time and will depend on the entered z-gate width. This value is often reported at a certain depth for a homogeneous material, but this description will be somewhat ambiguous as the "depth" of a signal is a function of the material impedance (density multiplied by the speed of sound). In the case of a composite laminate, this cannot be known a-priori as the material in question has a spatially varying material make-up and even the choice of matrix hardener have impact significantly the resulting speed of sound of the material.

Graphical User Interface

Figure 5:
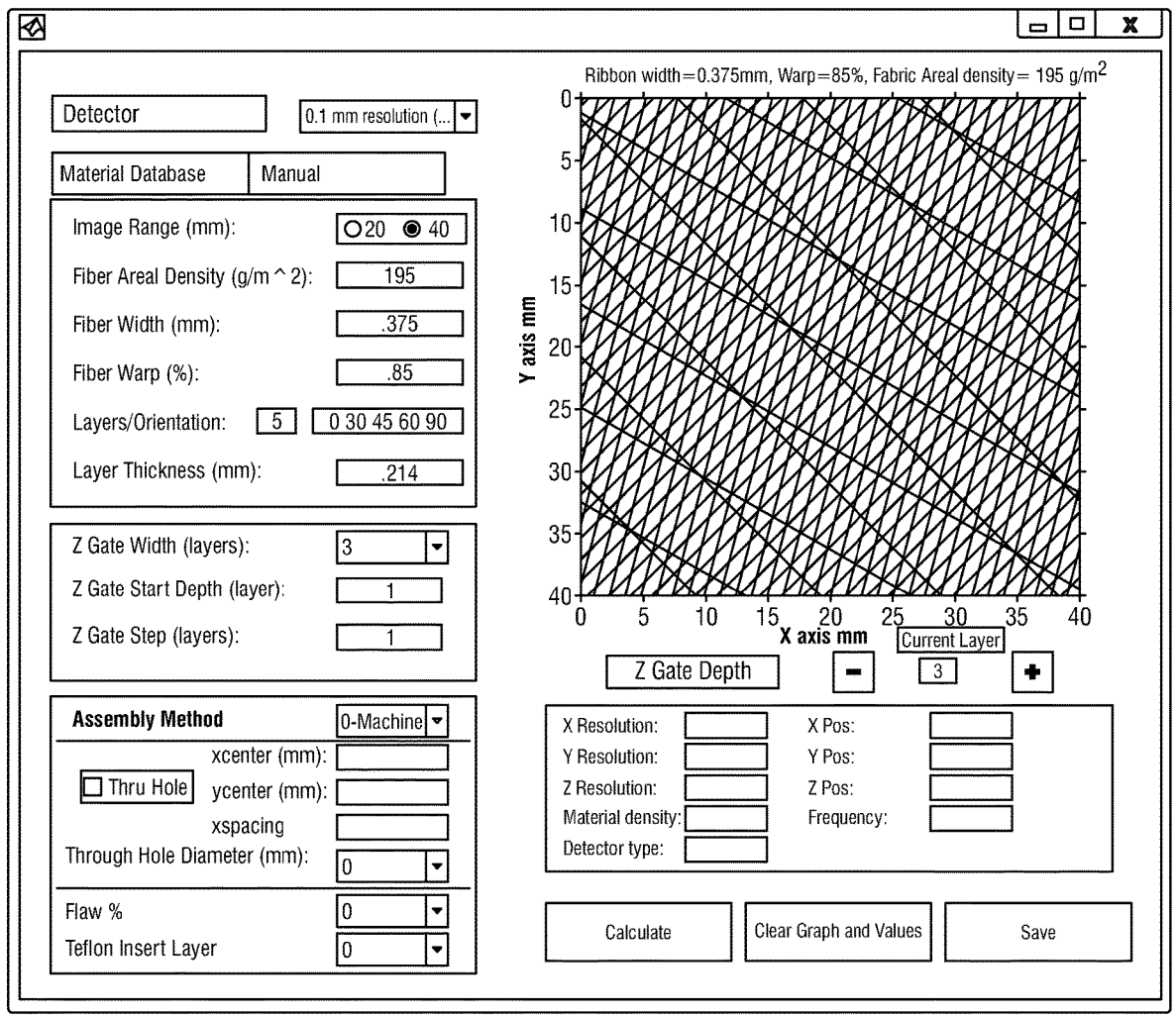
FIG. 5 illustrates an exemplary graphical user interface for the ultrasonic image simulator in accordance with one or more embodiments disclosed herein.

FIG. 5 illustrates an example of a graphical user interface (GUI) that may be provided with the ultrasonic detector simulator 402. As can be seen, in some embodiments, the user is provided with the option to select type of detector, which will establish the resolution of the ultrasonic scan to be output. The highest resolution provided by the simulated detector has 0.1 mm resolution in the X and Y axes and single-lamina resolution in the Z direction. Examples of available selections for "real" detectors include the Imperium I-600 detector with 0.21 mm resolution in the X and Y direction and Z resolution controlled by various frequency ranges and z-gate timing from 2.7 MHz-20 MHz.

Another user input choice is "manual" or "material database." If "manual" is selected, then the user may input the individual parameters manually. Selection of "material database" allows a user to select from a database of materials listing the available composite material data. The user may then select a material and the data therefor will be automatically loaded into the ultrasonic detector simulator 402.

An example of the data contained in the material database is provided in Table 1 below for various plies in several common composite laminates. These configurations were obtained from various handbooks and manufacturers databases, and are provided as typical examples of laminate stacks. Other sources may include the MIL-17 handbook series "Composite Materials Handbook," which contains the effective stiffness tensor data for a wide variety of military standard laminas.

TABLE 1

Material Properties

| Name | Aereal Density | Warp % | Tow Width | Fiber Volume | Ply Thickness | Num of Plys |
| --- | --- | --- | --- | --- | --- | --- |
| Cytec 7714A T650-35 | 195 | 0.5 | 0.376 | 0.54 | 0.2 | 18 |
| Cytec 7714A M461 | 195 | 0.95 | 0.394 | 0.54 | 0.2156 | 15 |
| Cytec 7714A SHST-35 | 380 | 0.5 | 0.75 | 0.57 | 0.429 | 10 |
| FiberCole T300 SHS 6K | 380 | 0.5 | 0.75 | 0.57 | 0.429 | 10 |
| Cytec 7740 T650-35-35-PW-195-4 | 195 | 0.5 | 0.376 | 0.54 | 0.2 | 18 |

Once a material is loaded, the user selects the z-gate width and z-gate start for output display. In perfect detector mode, this selection is accomplished in layer units and the z-gate step is in single layers. In simulated detector modes, this input is in millimeter for all three values and z-gate width is limited to unit wavelengths which is a function of the selected detector frequency.

The user may then select assembly methods, flaw sizes, holes and hole patterns, and the Teflon insert. Once all of these selections are made, the ultrasonic detector simulator 402 generates a series of C-scan images at different depths throughout the simulated laminate and displays the result. The user may then view the laminate at various depths by selecting the appropriate layer. The user may also select different z-gate widths and step sizes to produce an updated simulation. Simulations of different flaw sizes and detector types, or changes in material selections, may also be updated and recalculated. Once the ultrasonic detector simulator 402 has produced the simulated C-scans, the results can be saved for subsequent processing.

Figure 6:
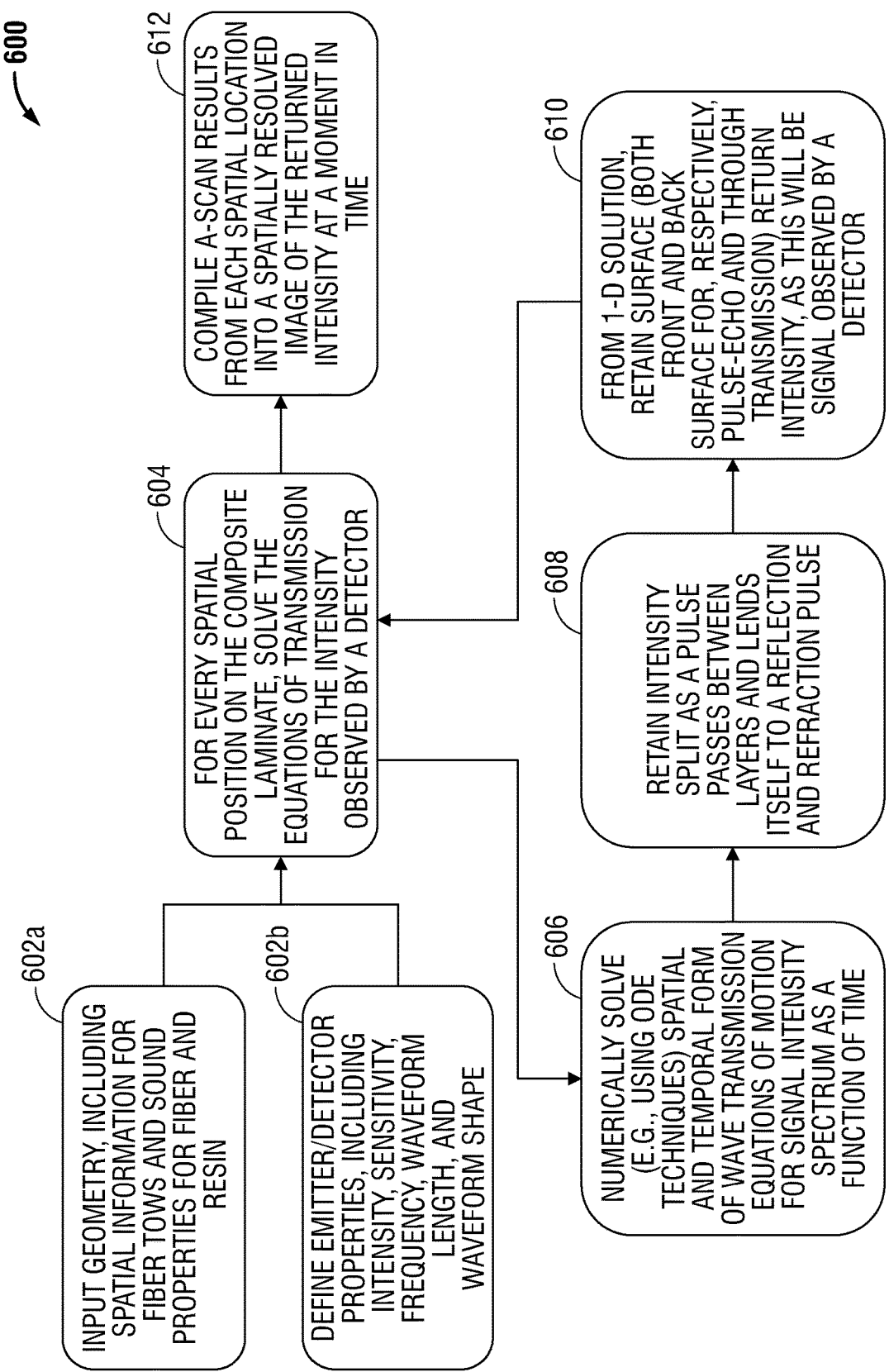
FIG. 6 illustrates an exemplary flow chart for simulating an ultrasonic image in accordance with one or more embodiments disclosed herein.

FIG. 6 illustrates the operation of the ultrasonic image simulator 400 described above in the form of a flowchart 600. As can be seen, operation of the ultrasonic image simulator 400 begins, including of the geometry of the composite laminate being simulated at block 602a, including spatial information for fiber tows and sound properties for fiber and resin, and the like, and defining the properties of the ultrasonic emitter/detector being simulated, including signal intensity, sensitivity, frequency, waveform length, waveform shape, and the like, at block 602b is. At block 604, for every spatial position (i.e., pixel) on the composite laminate, the ultrasonic image simulator 400 solves the equations of transmission for the intensity observed by a detector.

Then, at block 606, the ultrasonic image simulator 400 numerically solves (e.g., using ODE techniques) spatial and temporal form of wave transmission equations of motion for signal intensity spectrum as a function of time. These equations may be found, for example, in Lonne, S., A. Lhemery, P. Calmon, S. Biwa, and F. Thevenot, *Modeling of Ultrasonic Attenuation in Unidirectional Fiber Reinforced Composites Combining Multiple-Scattering and Viscoelastic Losses*, in review of Quantitative Nondestructive Evaluation, editors D. O. Thompson and D. E. Chimenti, pp. 875-882, published by American Institute of Physics, 2004 ("Lonne"). Specifically, Lonne provided plots that suggested an attenuation characteristic within a composite laminate. A mathematical form may be used for attenuation, as follows, $Attn=10^{-(af+b)\Delta x/20}$, where f is the frequency, a and b are experimentally observed coefficients, and $\Delta x$ is the distance covered by a pulse in a given time of interest.

At block 608, the ultrasonic image simulator 400 retains the intensity split as a pulse passes between layers and lends itself to a reflection and refraction pulse. At block 610, from the 1-dimensional solution, the ultrasonic image simulator 400 retains surface return intensity (both front and back surface for, respectively, pulse-echo and through transmission), as this represents the A-scan signal observed by a detector. Once the above operations have been performed for every spatial position (i.e., pixel) on the composite laminate, then at block 612, the ultrasonic image simulator 400 compiles the A-scans from each spatial location into a spatially resolved image of the returned intensity at a moment in time. These compiled A-scans results comprise the C-scan images that are subsequently provided to the ply detection component 302 for further analysis (see FIG. 7).

Ply Detection Process

Continuing with embodiments of the invention, data representing the C-scan images of the composite laminate, whether from an actual detector or simulated as described above, is provided to the ply detection component 302 for further processing. Actual detector data, of course, means the analysis is being performed on a real composite laminate sample, whereas simulated data may be more beneficial for purposes of testing and fine tuning the operation of the ply detection component 302.

Figure 7:
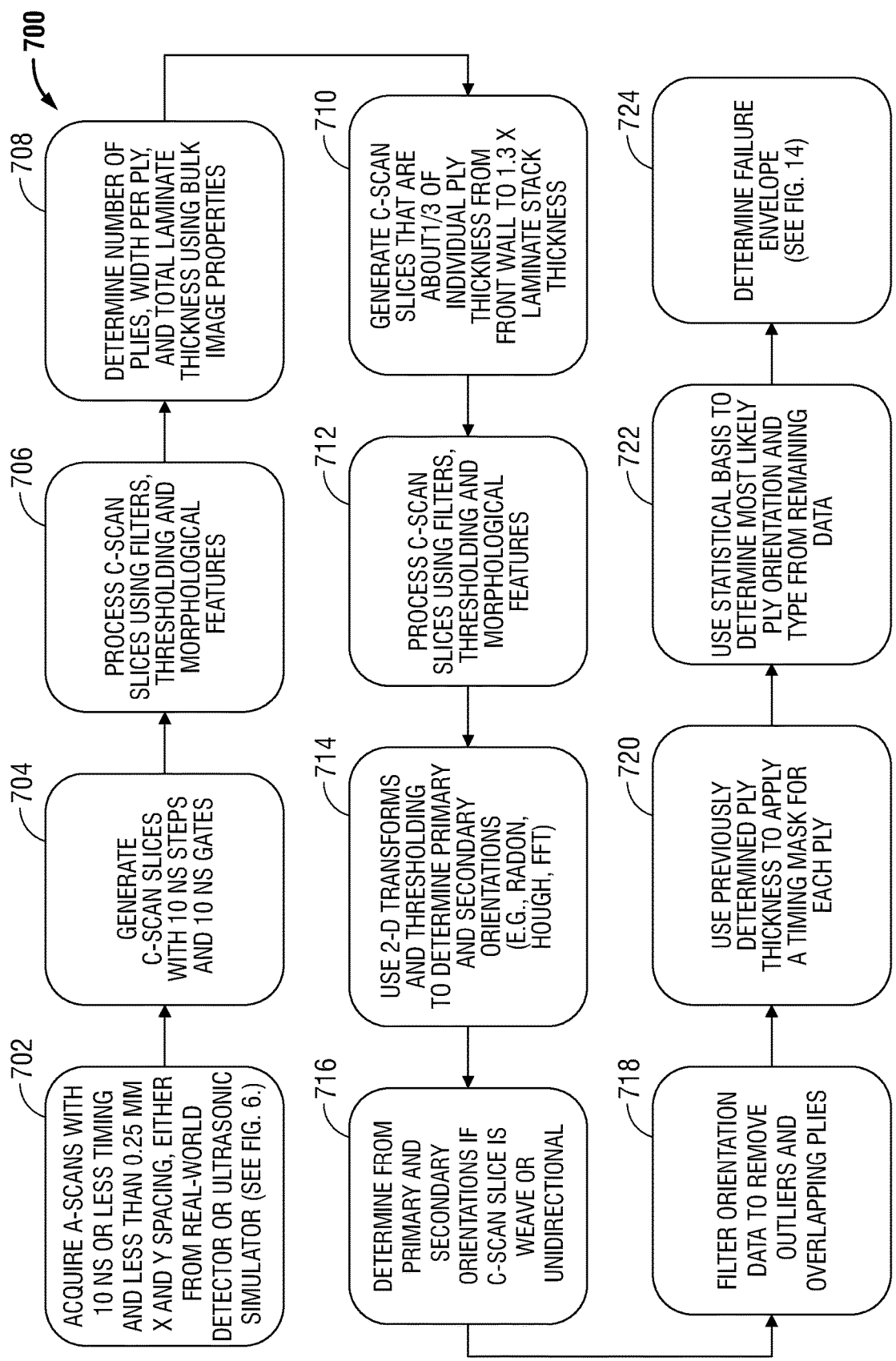
FIG. 7 illustrates an exemplary flowchart for detecting ply properties in accordance with one or more of the embodiments disclosed herein.
Figure 8:
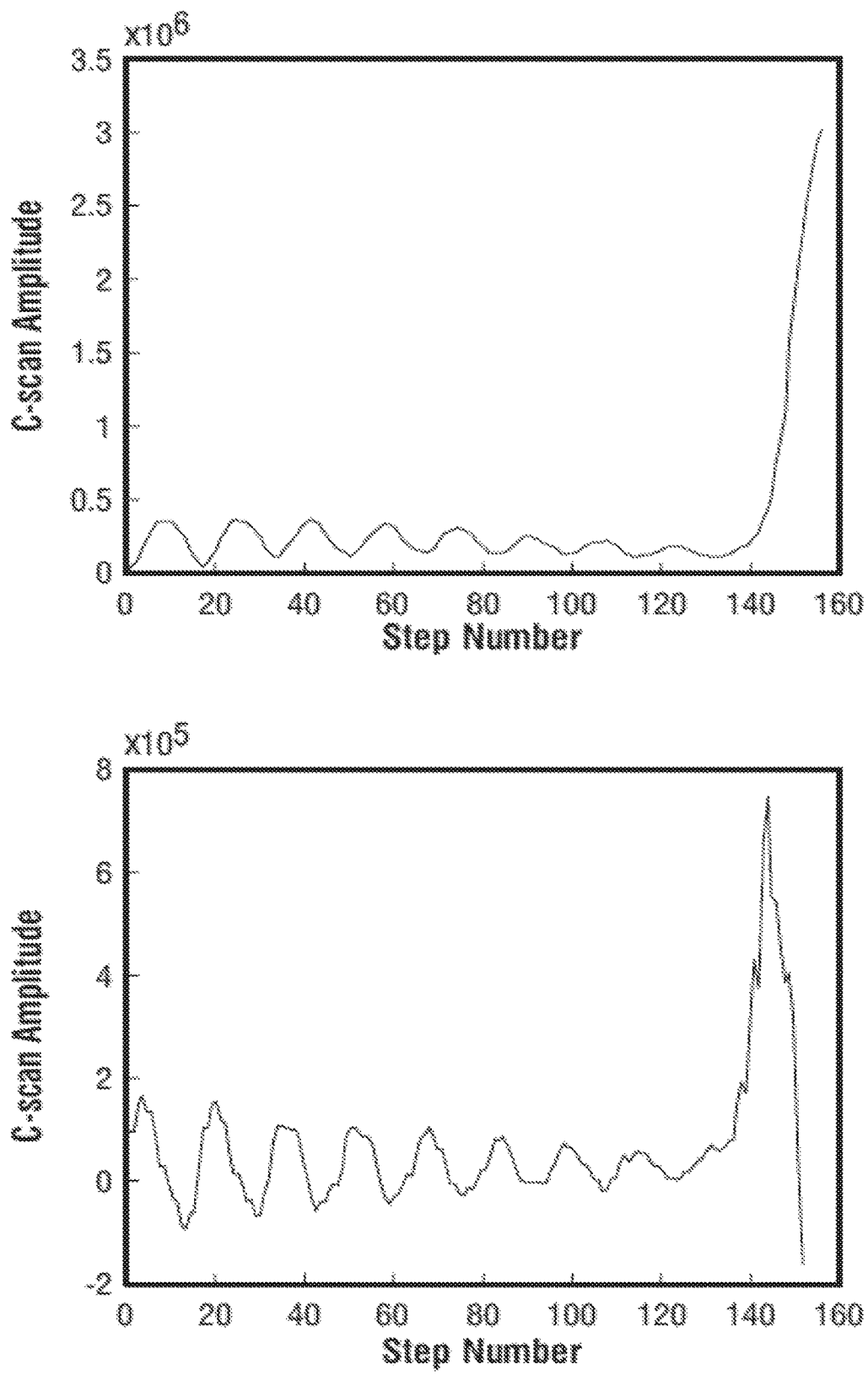
FIG. 8 illustrates exemplary ply thickness plots in accordance with one or more of the embodiments disclosed herein.

FIG. 7 generally illustrates the operation of the ply detection component 302 in the form of a flowchart 700, beginning with block 702, where A-scans with 10 ns or less timing and less than 0.25 mm spacing in the X and Y direction are acquired, either from a real detector or from an ultrasonic simulator (see FIG. 6.), for a composite laminate. The ply detection component 302 uses these A-scans to generate C-scan slices with 10 ns steps or increments and 10 ns z-gates at block 704 by integrating the A-scan amplitude data over the timing gate relative to the initiation of the reflected signal which signifies the front face of the laminate. In this way, the timing from all A-scan represents the same depth within the laminate producing a slice across the laminate at a known depth. At block 706, the ply detection component 302 processes the C-scan slices using filters, thresholding and morphological features. These filters include normalizing the signal and applying various top and bottom thresholds to remove noise or saturated signals which would cause inaccuracies in the image transforms. When identifying weave types, various linear and 2-dimensional morphological filters are used to pass or remove signals prior to final image transforms. At block 708, the ply detection component 302 uses the bulk C-scan amplitude signal as shown in FIG. 8 to determine the number of plies, the width per ply, and the total laminate thickness using bulk image properties.

Figure 9:
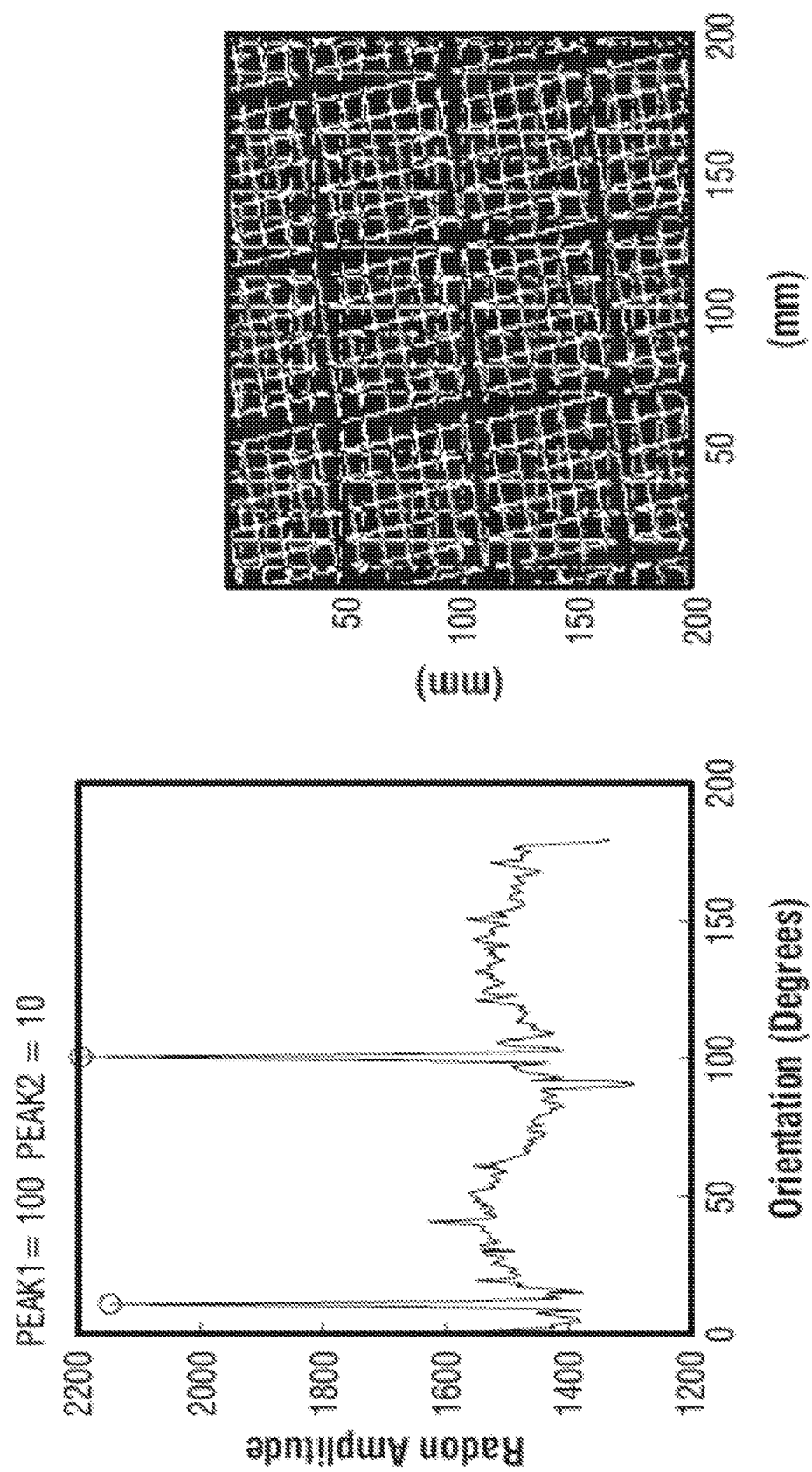
FIG. 9 illustrates exemplary ply orientations in accordance with one or more of the embodiments disclosed herein.

At block 710, the ply detection component 302 again generates C-scan slices using the A-scans, except that these C-scan slices are about a third of the individual ply thickness from the front wall to 1.3 times the laminate stack thickness. This is done to ensure a given slice represents the "center" of a ply and is therefore not compromised by the ply above or the ply below. These C-scan slices are again processed using filters, thresholding, and linear morphological features at block 712. At block 714, the ply detection component 302 applies one of several possible 2-dimensional transforms and thresholding to the C-scan slices to determine their primary and secondary orientations. Primary orientations are the highest resultant transform signal and secondary orientations are the second highest transform signal from the filtered results as shown in FIG. 9 for a simulated weave. Examples of 2-dimensional transforms that may be used include the well-known Radon transform, Hough transform, Eigensystem analysis, the Fast Fourier Transform (FFT), and the like.

Once the primary and secondary orientations are determined, as at block 716, the ply detection component 302 uses the orientations to determine whether each C-scan slice is a weave or unidirectional. This determination is performed by first filtering the orientation data to remove outliers, and overlapping plies, at block 718. At block 720, the ply detection component 302 uses the previously determined ply thickness to apply a timing mask corresponding to the predicated steps for each individual ply. The ply detection component 302 thereafter uses statistical techniques to determine the most likely ply orientation by looking at a histogram of most likely ply angles for the steps associated with a given ply mask and type (e.g., weave, unidirectional, etc.) from the remaining data, at block 722. By statistically building up data from all slices in a given ply, a most probable determination can be made. With the information on the number of plies, ply thickness, and ply orientation now available, a failure envelope may be determined for the composite laminate.

Operation of the ply detection component 302 discussed above was studied over a range of possible ply examples. For these examples, a narrow z-step size (10 ns) and a narrow z-gate (100 ns) was used to create approximately 15 images per ply for thin plies and approximately 30 images per ply for thick plies. These numbers provided sufficient statistical data to determine a final ply orientation. The study produced an output of the bulk image properties as a function of z-step size, similar to that shown in FIG. 8. In the figure, the ply thickness output for a 10-ply stack is shown in the plot on the left, where the vertical axis represents C-scan amplitude and the horizontal axis represents the number of z-steps being made. The result is a smoothed plot of the bulk response showing peaks at several steps, with the last step being the back wall. The plot on the right shows the number of plies as determined by the number of first derivative zero crossings, plus 1 zero crossing assumed for the first layer.

Once the number of plies is determined and the total thickness is determined, the number of z-steps being made per ply may be determined. The number of z-steps per ply and initial z-step showing signal (where z-gate plus z-step crosses the boundary from ply 1 to ply 2) allows for a mask to be used to isolate the plies. In the example shown in FIG. 8, this is about 17 z-steps per ply. Ply number 2 information is provided between z-steps 8 and 24. Ply number 3 information is between z-steps 25 and 41, and so forth.

FIG. 9 is an example of the ply orientation for the example of FIG. 8, corresponding to ply number 1 (zero degrees orientation) and ply number 2 (10 degrees orientation). In this example, the plot on the left side, with the vertical axis representing Radon amplitude and the horizontal axis representing orientation in degrees, was derived using a modified Radon function, where various filters were applied with an orientation from 0 to 180 degrees for detection. In that plot, the right peak (Peak 1, at about 100 degrees) represents the primary orientation and the left peak (Peak 2, at about 10 degrees), represents the second reorientation. The image on the right is the C-scan output of the ultrasonic detector simulator 402 corresponding to the Radon image on the left. As can be seen, the plot on the left shows the primary and secondary fiber orientation peaks for each z-step. From this left plot, an orientation may be determined. If the two peaks are roughly 90 degrees out of phase with each other and of roughly the same magnitude, a determination may be made that this represents a weave. The z-step here indicates a weave fiber pattern because, although a unidirectional fiber can show two peaks, the primary and secondary peaks are usually on top of each other. The ply type (weave or unidirectional) may therefore be determined automatically in some embodiments.

Figure 10:
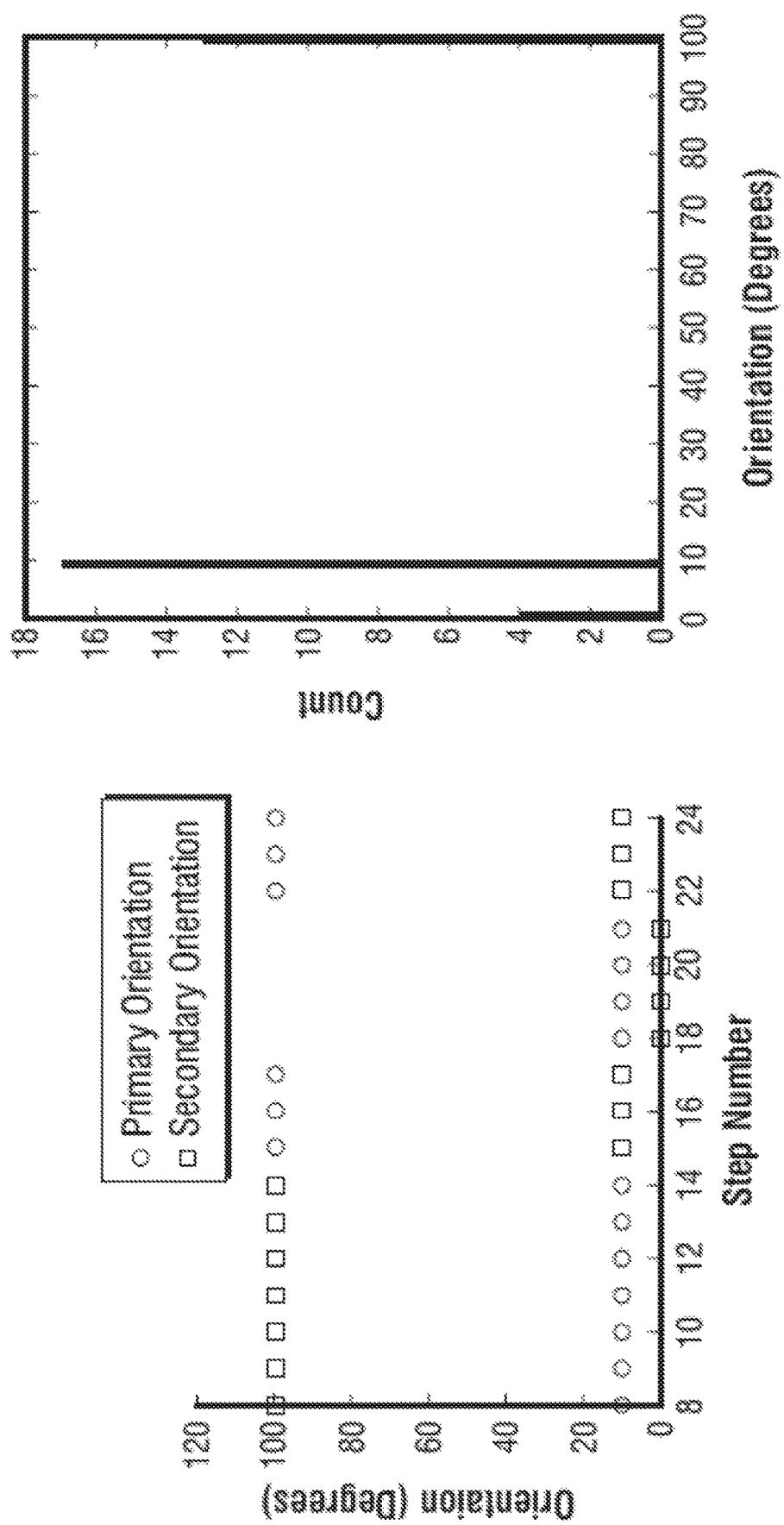
FIG. 10 illustrates an exemplary scatterplot and associated histogram of ply orientations in accordance with one or more of the embodiments disclosed herein.

FIG. 10 shows an example of a scatterplot (left-hand plot) of determined primary and secondary orientations from z-steps 8 through 24. This scatterplot shows either a 10 degree or 100 degree orientation, with the horizontal axis representing z-step number, and the vertical axis representing angles in degrees, and circles represent the primary orientation and squares represent the secondary orientation. Using the histogram approach on the primary and secondary peaks, the right plot shows the output determination for ply number 2—a weave with primary orientation 10 degrees and secondary orientation 100 degrees—where the horizontal axis is angles in degrees, and the vertical axis is the count corresponding to the primary and secondary angles from each step in the left-hand plot).

Figure 11:
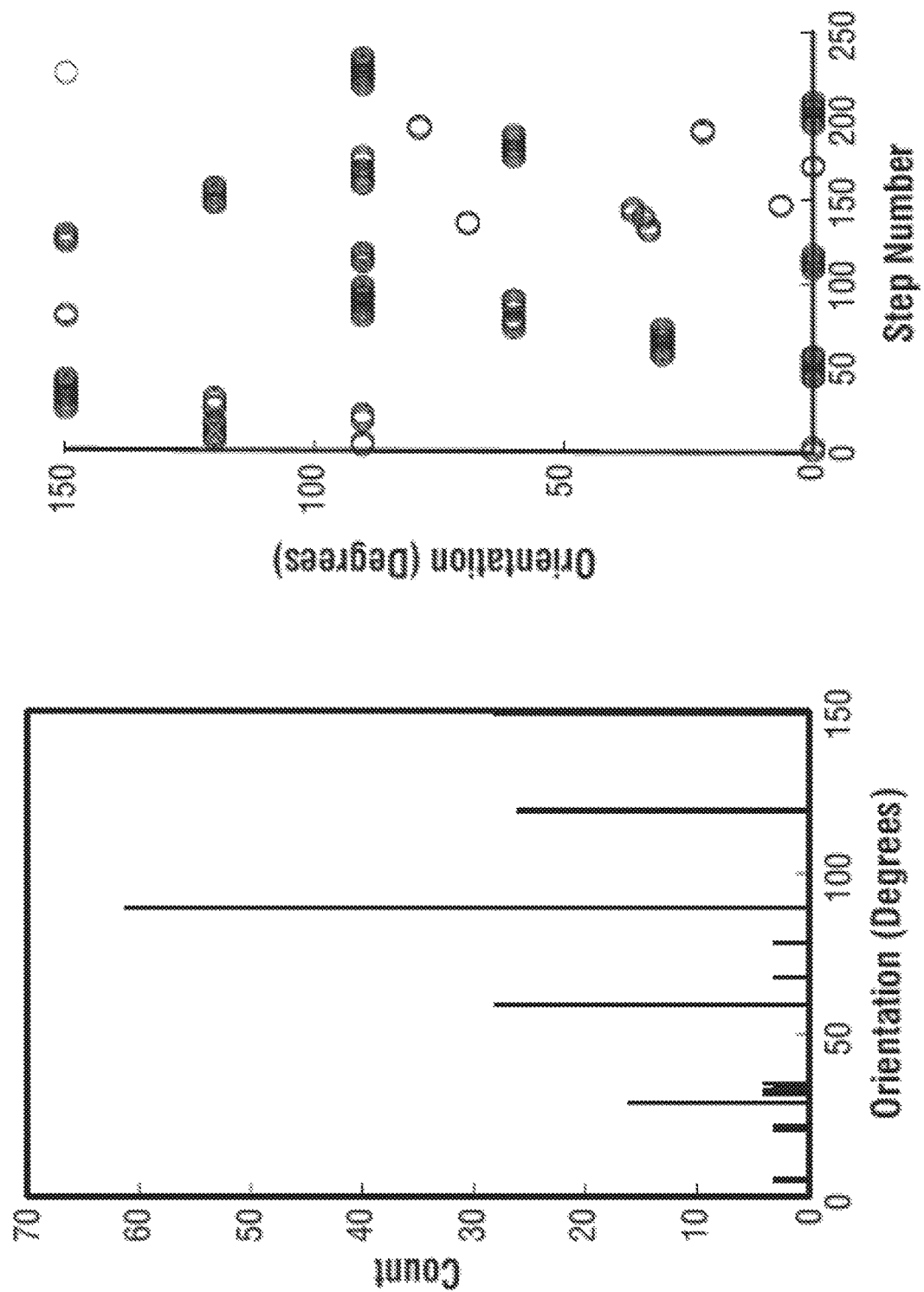
FIG. 11 illustrates an unfiltered exemplary histogram and associated scatter plot of ply orientations in accordance with one or more of the embodiments disclosed herein.
Figure 12:
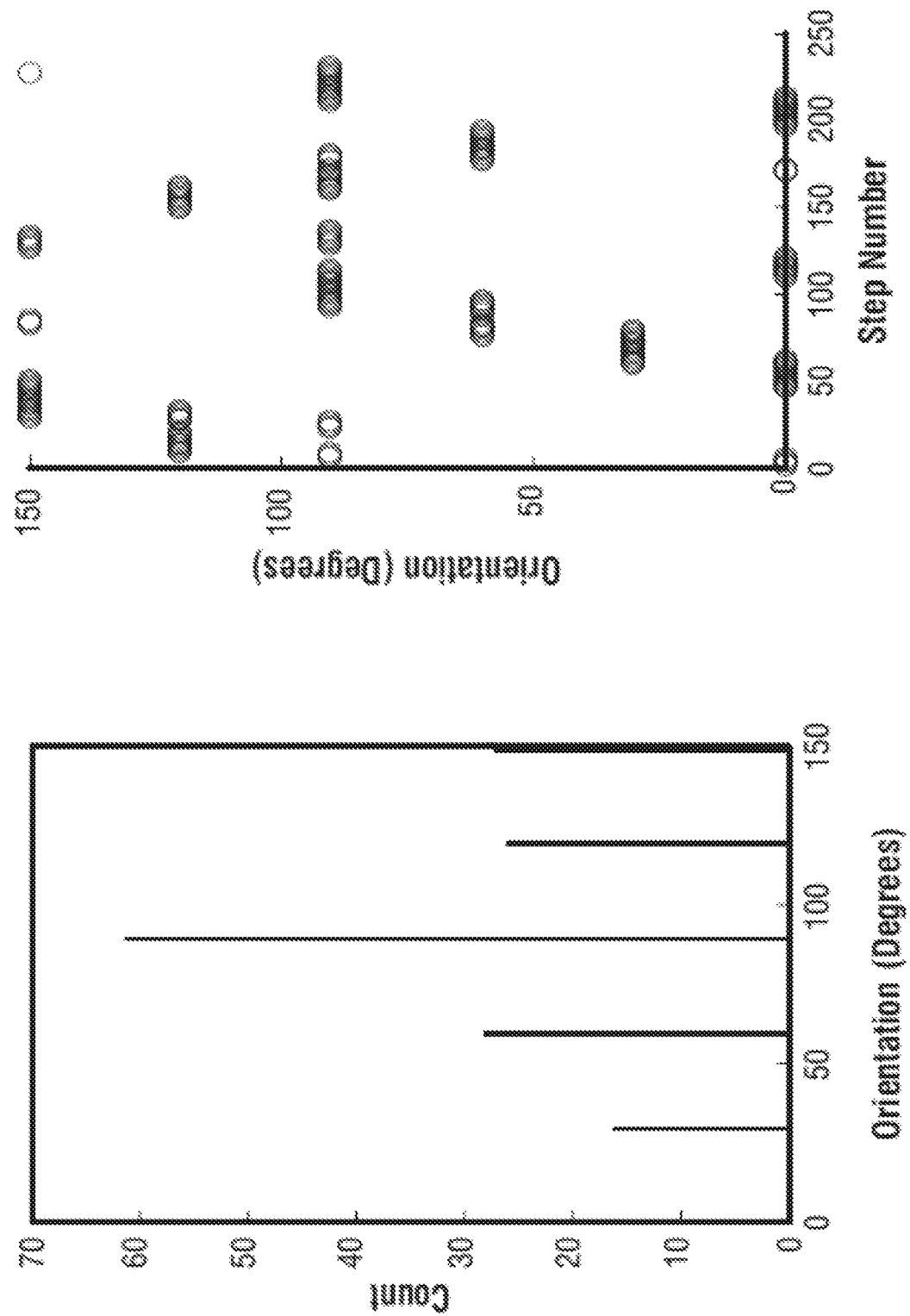
FIG. 12 illustrates the filtered version of FIG. 11 showing an exemplary histogram and associated scatter plot of ply orientations in accordance with one or more of the embodiments disclosed herein.

A filter may be applied to determine the orientations that represent real signals versus noise, as may be shown in the illustrative examples of FIGS. 11 and 12. In these figures, the left-hand plots are similar to the plot shown in FIG. 10, while the right-hand plots have the z-steps along the horizontal axis and ply orientation angles along the vertical axis. FIG. 11 is the unfiltered histogram for a unidirectional case with possible ply orientations 0, 30, 60, 90, 120, and 150 degrees (for a 0 to 180 degree orientation), and FIG. 12 is the filtered histogram showing the determined possible orientations.

Figure 13:
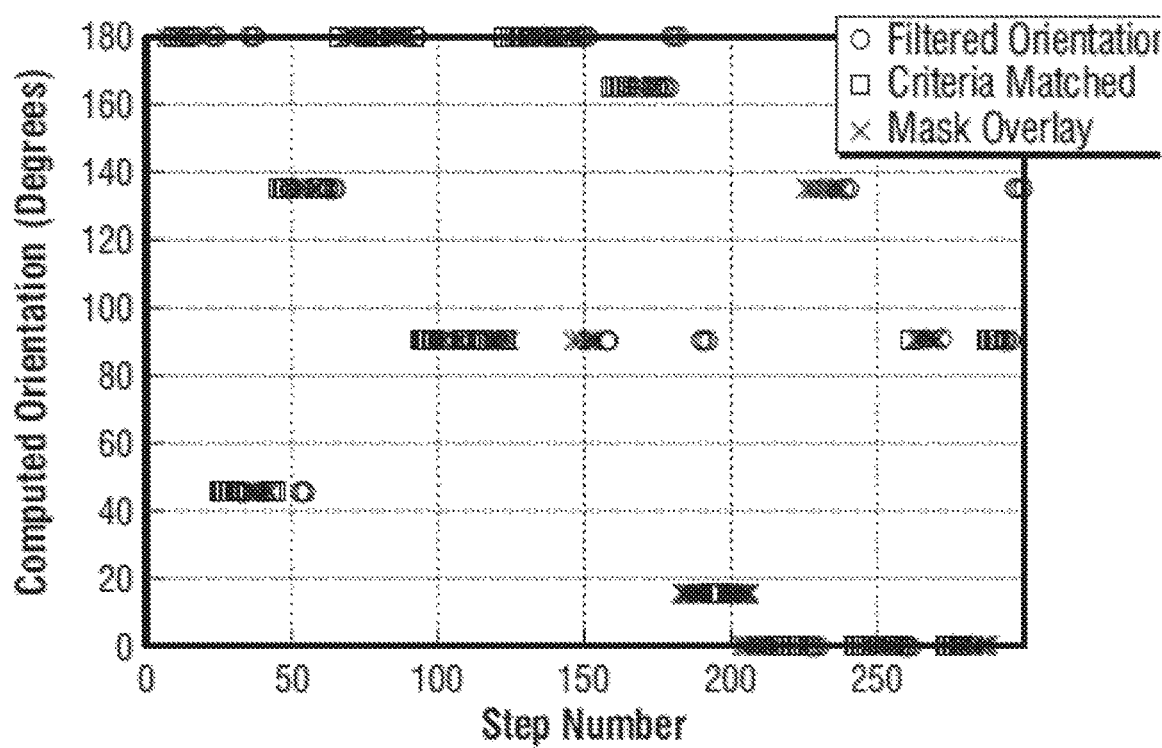
FIG. 13 illustrates an exemplary spreadsheet and associated scatter plot of ply properties in accordance with one or more of the embodiments disclosed herein.

The final results for the ply detections may be presented, for example, in the form of a spreadsheet similar to the one shown in FIG. 13, which is being provided for illustrative purposes only. The example spreadsheet shows some of the relevant ply information and a graphic showing the detected ply orientation as a function of z-step. In this example, the spreadsheet includes the ply number (first column from left), the calculated ply orientation (second column), actual orientation (third column), and ply type (e.g., unidirectional, weave, etc.) (fourth column). The fifth and six columns show the average computed thickness and average actual thickness for the plies, respectively. These results may then be provided to the failure prediction component 304 to be used for probabilistic failure envelope determination.

Figure 14:
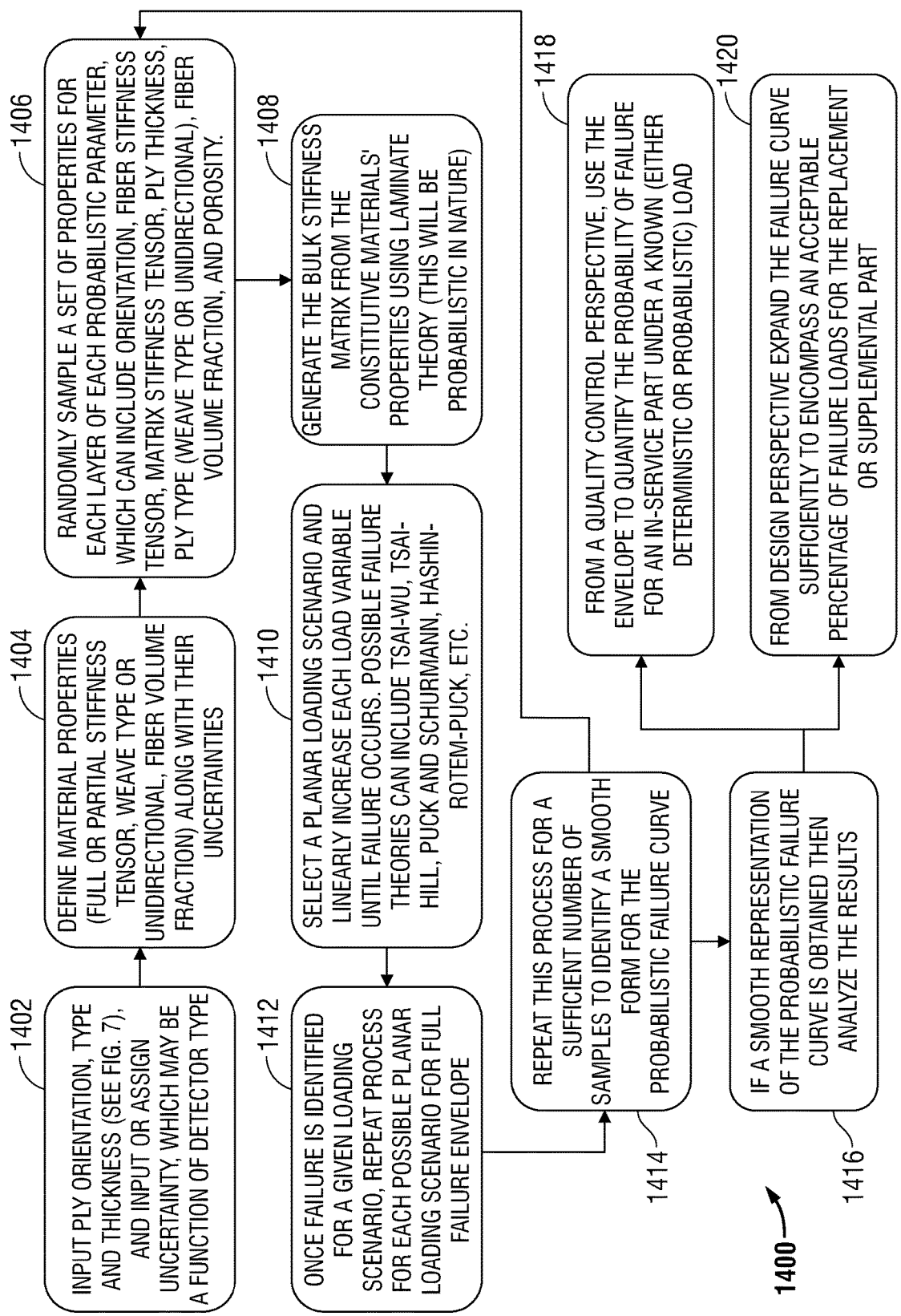
FIG. 14 illustrates an exemplary flowchart for determining a laminate failure envelope in accordance with one or more of the embodiments disclosed herein.

The foregoing failure prediction operation is set forth in FIG. 14 in terms of a flow chart 1400. Beginning at block 1402, the failure prediction component 304 receives the ply orientation after step 722 of FIG. 7, ply type and thickness from the ply detection component 302. Any uncertainty or variability as a function of the detector type may also be inputted or signed at this time in the form of the stochastic distribution or in terms of the mean and variance of the input. At block 1404, the material properties (either the fiber and matrix moduli, failure parameters, packing density, and fabric type, or the experimentally obtained or manufacture supplied lamina stiffness tensor and failure parameters) for the composite laminate sample may be defined or otherwise provided to the failure prediction component 304 along with their uncertainties.

Thereafter, the failure protection component randomly samples a set of properties for each layer of each probabilistic parameter, which may include orientation, fiber stiffness tensor, matrix stiffness tensor, ply thickness, ply type (weave type or unidirectional), fiber volume fraction, porosity, and so forth, at block 1406. At block 1408, the failure prediction component 304 generates the bulk laminate stiffness matrix from the constitutive materials' properties. This may be done using well-known laminate theory (see, e.g., Jones) and may be probabilistic in nature. The failure prediction component 304 then selects a planar loading scenario and linearly increase each load variable until failure occurs, at block 1410. Possible failure theories that may be used here include Tsai-Wu and Tsai-Hill, as both were discussed in K-S Liu, S. W. Tsai, *A Progressive Quadratic failure criterion for nonlinear analysis of composite laminates subjected to biaxial loading*, Composites Science and Technology, 1998 58:1107-1124 ("Liu and Tsai"); A. Puck, H. Schurmann, *Failure analysis of frp laminates by means of physically based phenomenological model*, Composites Science and Technology, 58(7), 1045-1067 ("Puck and Schurmann"); and the like.

Once failure is identified for a given loading scenario, the failure prediction component 304 repeats the process for each possible planar loading scenario for full failure envelope at block 1412. At block 1414, the failure prediction component 304 returns to block 1406 and this process is repeated for a sufficient number of samples to identify a smooth form for the probabilistic failure curve. If a smooth representation of the probabilistic failure curve is obtained, then the results are analyzed at block 1416. The analysis may involve, from a quality control perspective, using use the envelope to quantify the probability of failure for an in-service part under a known (either deterministic or probabilistic) load, at block 1418. Alternatively, at block 1420, the analysis may involve, from a design perspective, expanding the failure curve sufficiently to encompass an acceptable percentage of failure loads for a replacement or supplemental part.

Such an arrangement is particularly useful for modifiers of composite structures who do not have direct access to original manufacturing, operations, maintenance and repair information. QA personnel who provide various composite structure quality assurance services where the OEM information is typically available may also find the disclosed laminate characterization system beneficial.

The foregoing embodiments can characterize and quantify composite laminate structures. These embodiments take a composite laminate of unknown ply stack composition and sequence and determine various information about the individual plies, such as ply stack, orientation, microstructure, and type. The embodiments can distinguish between weave types that may exhibit similar planar stiffness behaviors, but would produce considerably different failure mechanisms. The information about the plies may then be used to derive the laminate bulk properties from externally provided constitutive properties of the fiber and matrix, such as extensional stiffness, bending-extension coupling stiffness, bending stiffness, and the like. The laminate bulk properties may then be used to generate a probabilistic failure envelope for the composite laminate. This allows facility owners and operators in various industries to assess, support, and maintain composite laminate structures, particularly old and aging structures, independently of the original manufacturing failure information or predictions for the composite laminates structures. The embodiments further provide the ability to perform non-destructive quality assurance to ensure, for example, that individual lamina layup was accomplished according to design specifications, and results can be used to identify a wide range of laminate properties beyond purely structural.

While the disclosed embodiments have been described with reference to one or more particular implementations, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A computer-aided non-destructive method of quantifying individual laminas in a composite laminate, the method comprising:
   controlling a z-start time and a z-gate time of at least one pulse-wave detector to generate ultrasonic composite scan data;
   processing the ultrasonic composite scan data using a processor to generate an array of data for a plurality of spatial locations across a surface of the composite laminate, the array including signal intensity data and signal time-of-flight data for a signal reflected off material transitions within the composite laminate as a function of the z-start time and the z-gate time;
   calculating lamina properties by the processor based on the processed composite scan data, the lamina properties including ply type, including unidirectional or weave, weave type and at least one or more other lamina properties including number of individual laminas, and thickness of each individual lamina;
   determining fiber and matrix moduli and failure parameters and in response calculating a failure load for the individual laminas by the processor based on the one or more lamina properties; and
   generating a probabilistic failure envelope by statistically determining the probabilistic failure envelope for the composite laminate by the processor using one or more of the lamina failure parameters.

2. The method according to claim 1, wherein the fiber orientation of each individual lamina is determined by numerically integrating the array in an X direction and a Y direction for a plurality of layers for each individual lamina to identify a primary fiber orientation and at least a secondary fiber orientation indicative of a weave for at least one layer of each individual lamina.

3. The method according to claim 2, wherein the mathematical transform comprises performing one of the following for the at least one layer of each individual lamina: a Radon transform, a Hough transform, an Eigensystem analysis, and a Fast Fourier transform.

4. The method according to claim 2, further comprising numerically determining by the processor using the array of processed composite scan data whether the at least one layer of each individual lamina is unidirectional or weave based on the primary fiber orientation and secondary fiber orientation of the at least one layer of each individual lamina.

5. The method according to claim 1, wherein the array of composite scan data is ultrasonic C-scan data.

6. The method according torr 1, wherein the array of composite scan data is one of the following: data simulated by a simulated ultrasonic C-scan, and data acquired by a real ultrasonic detector.

7. The method according to claim 1, wherein determining one or more lamina properties by the processor comprises processing the composite scan data using filters, thresholding, and morphological features.

8. A computer system for non-destructive quantifying of individual laminas in a composite laminate, the computer system comprising:
   a processor;
   a storage device connected to the processor, the storage device storing an application thereon for causing the processor to:
   process ultrasonic composite scan data received into the computer system from an ultrasonic scanner, the processed ultrasonic composite scan data representative of a composite scan of the composite laminate, the ultrasonic composite scan data indicating, for each one of an array of spatial locations across a surface of the composite laminate, signal intensity and signal time-of-flight for a signal reflected off material transitions within the composite laminate;
   calculate lamina properties based on the composite scan data, the lamina properties including ply type, including unidirectional or weave, weave type and at least one or more other lamina properties including number of individual laminas, and thickness of each individual lamina;
   determine a fiber and matrix moduli and failure parameters and in response calculate a failure load for the individual laminas based on the one or more lamina properties; and
   generate a probabilistic failure envelope by statistically determining the probabilistic failure envelope for the composite laminate using one or more of the lamina properties and the failure load for the individual laminas;

wherein the processor determines ply type by determining whether each individual lamina is unidirectional or weave based on fiber orientation of each individual lamina by processing the array of signal intensity data and signal time-of-flight data at a given depth within the laminate.

9. The computer system according to claim 8, wherein the fiber orientation of each individual lamina is determined by the processor using a mathematical transform to identify a primary fiber orientation and a secondary fiber orientation indicative of a weave for each individual lamina, and the processor controls a z-start time and a z-gate time of a plurality of pulse-wave detectors to generate ultrasonic composite scan data for a plurality of layers for each individual lamina.

10. The computer system according to claim 9, wherein the mathematical transform may be one of the following: a Radon transform, a Hough transform, an Eigensystem analysis, and a Fast Fourier transform, and is performed one or more layers of a plurality of layers for each individual lamina.

11. The computer system according to claim 9, the processor determines whether each individual lamina is unidirectional or weave based on the primary fiber orientation and secondary fiber orientation of at least one layer of a plurality of layers for each individual lamina and the array is generated using sub-microsecond z-gating times and ultrasonic frequencies equal or greater than about 10 MHz.

12. The computer system according to claim 8, wherein the composite scan data is ultrasonic C-scan data that is obtained for a plurality of layers of each of one or more lamina.

13. The computer system according to claim 8, wherein the composite scan data is one of the following: data simulated by a simulated ultrasonic C-scan, and data acquired by a real ultrasonic detector for a plurality of layers of each of one or more lamina.

14. The computer system according to claim 8, wherein the processor determines the one or more lamina properties by processing the composite scan data using filters, thresholding, and morphological features.

15. A non-transitory computer-readable medium containing computer-readable instructions for instructing a computer to perform non-destructive quantifying of individual laminas in a composite laminate, the computer-readable instructions comprising instructions for causing the computer to:

process ultrasonic composite scan data from an ultrasonic scanner, the ultrasonic composite scan data representative of a composite scan of the composite laminate, the ultrasonic composite scan data indicating, for each one of an array of spatial locations across a surface of the composite laminate, signal intensity and signal time-of-flight for a signal reflected and refracted off material transitions within the composite laminate;

calculate lamina properties based on the processed composite scan data, the lamina properties including ply type, including unidirectional or weave, weave type and at least one or more other lamina properties including number of individual laminas, and thickness of each individual lamina;

determine fiber and matrix moduli and failure parameters and in response calculate a failure load for the individual laminas based on the one or more lamina properties; and generate a probabilistic failure envelope by statistically determining the probabilistic failure envelope for the composite laminate using one or more of the lamina properties and the failure load for the individual laminas.

16. The non-transitory computer-readable medium according to claim 15, wherein the computer-readable instructions cause the computer to control operation of the ultrasonic scanner to generate data for a plurality of layers of each of one or more lamina and to determine the fiber orientation of each individual lamina by using a mathematical transform to identify a primary fiber orientation and a secondary fiber orientation indicative of a weave for each individual lamina.

17. The non-transitory computer-readable medium according to claim 16, wherein the mathematical transform may be one of the following: a Radon transform, a Hough transform, an Eigensystem analysis, and a Fast Fourier transform for at least one of the layers of each of the one or more lamina.

18. The non-transitory computer-readable medium according to claim 16, wherein the computer-readable instructions cause the computer further to determine whether each individual lamina is unidirectional or weave based on the primary fiber orientation and secondary fiber orientation of each individual lamina as a function of determined properties of one or more layers for the each individual lamina.

19. The non-transitory computer-readable medium according to claim 15, wherein the composite scan data is ultrasonic C-scan data for each lamina.

20. The non-transitory computer-readable medium according to claim 15, wherein the composite scan data is one of the following: data simulated by a simulated ultrasonic C-scan, and data acquired by a real ultrasonic detector for a plurality of layers for each lamina.

21. The non-transitory computer-readable medium according to claim 15, wherein the computer-readable instructions cause the computer to determine one or more lamina properties by processing the composite scan data using filters, thresholding, and morphological features.

22. A computer-aided non-destructive method of quantifying individual laminas in a composite laminate, the method comprising:

processing ultrasonic composite scan data received by a processor from an ultrasonic scanner, the processed ultrasonic composite scan data representative of a composite scan of the composite laminate, the ultrasonic composite scan data indicating, for each one of an array of spatial locations across a surface of the composite laminate, signal intensity and signal time-of-flight for a signal reflected off material transitions within the composite laminate;

calculating lamina properties by the processor based on the processed composite scan data, the lamina properties including ply type, including unidirectional or weave, weave type and at least one or more other lamina properties including number of individual laminas, and thickness of each individual lamina;

determining fiber and matrix moduli and failure parameters and in response calculating a failure load for the individual laminas by the processor based on the one or more lamina properties; and generating a probabilistic failure envelope by statistically determining the probabilistic failure envelope for the composite laminate by the processor using one or more of the lamina failure parameters;

wherein calculating lamina properties further comprises filtering the composite scan data to determine a primary and a secondary fiber orientation and determining whether each individual lamina is unidirectional or weave based on amplitude and phase associated with the primary and the secondary fiber orientation, wherein a primary and a secondary fiber orientation have corresponding amplitudes and are out of phase by approximately 90 degrees indicates a weave.

23. A computer system for non-destructive quantifying of individual laminas in a composite laminate, the computer system comprising:

a processor;

a storage device connected to the processor, the storage device storing an application thereon for causing the processor to:

process ultrasonic composite scan data received into the computer system from an ultrasonic scanner, the processed ultrasonic composite scan data representative of a composite scan of the composite laminate, the ultrasonic composite scan data indicating, for each one of an array of spatial locations across a surface of the composite laminate, signal intensity and signal time-of-flight for a signal reflected off material transitions within the composite laminate;

calculate lamina properties based on the composite scan data, the lamina properties including ply type, including unidirectional or weave, weave type and at least one or more other lamina properties including number of individual laminas, and thickness of each individual lamina;

determine a fiber and matrix moduli and failure parameters and in response calculate a failure load for the individual laminas based on the one or more lamina properties; and generate a probabilistic failure envelope by statistically determining the probabilistic failure envelope for the composite laminate using one or more of the lamina properties and the failure load for the individual laminas;

wherein the processor calculates at least one lamina property by filtering the composite scan data to determine a primary and a secondary fiber orientation and determining whether each individual lamina is unidirectional or weave based on amplitude and phase associated with the primary and the secondary fiber orientation, wherein a primary and a secondary fiber orientation have corresponding amplitudes and are out of phase by approximately 90 degrees indicates a weave.

24. A non-transitory computer-readable medium containing computer-readable instructions for instructing a computer to perform non-destructive quantifying of individual laminas in a composite laminate, the computer-readable instructions comprising instructions for causing the computer to:

process ultrasonic composite scan data from an ultrasonic scanner, the ultrasonic composite scan data representative of a composite scan of the composite laminate, the ultrasonic composite scan data indicating, for each one of an array of spatial locations across a surface of the composite laminate, signal intensity and signal time-of-flight for a signal reflected off material transitions within the composite laminate;

calculate lamina properties based on the processed composite scan data, the lamina properties including ply type, including unidirectional or weave, weave type and at least one or more other lamina properties including number of individual laminas, and thickness of each individual lamina;

determine fiber and matrix moduli and failure parameters and in response calculate a failure load for the individual laminas based on the one or more lamina properties; and generate a probabilistic failure envelope by statistically determining the probabilistic failure envelope for the composite laminate using one or more of the lamina properties and the failure load for the individual laminas;

wherein the computer-readable instructions cause the computer to calculate at least one lamina property by filtering the composite scan data to determine a primary and a secondary fiber orientation and determining whether each individual lamina is unidirectional or weave based on amplitude and phase associated with the primary and the secondary fiber orientation, wherein a primary and a secondary fiber orientation have corresponding amplitudes and are out of phase by approximately 90 degrees indicates a weave.

\* \* \* \* \*